United States Patent
Garbus et al.

[11] Patent Number: 5,884,027
[45] Date of Patent: Mar. 16, 1999

[54] ARCHITECTURE FOR AN I/O PROCESSOR THAT INTEGRATES A PCI TO PCI BRIDGE

[75] Inventors: Elliot Garbus, Scottsdale; Peter Sankhagowit, Phoenix; Marc Goldschmidt, Tempe; Nick Eskandari, Chandler, all of Ariz.

[73] Assignee: Intel Corporation, Santa Clara, Calif.

[21] Appl. No.: 870,141

[22] Filed: Jun. 5, 1997

Related U.S. Application Data

[63] Continuation of Ser. No. 490,654, Jun. 15, 1995, abandoned.

[51] Int. Cl.$^6$ .................................................... G06F 13/00
[52] U.S. Cl. .................. 395/200.8; 395/309; 370/402
[58] Field of Search ..................... 395/287, 306, 395/309, 726, 733, 800.01, 856, 200.8, 200.83; 370/257, 351, 401, 402; 340/825.5

[56] References Cited

U.S. PATENT DOCUMENTS

| | | | |
|---|---|---|---|
| 4,935,868 | 6/1990 | Dulac | 395/290 |
| 4,935,894 | 6/1990 | Gernes et al. | 395/309 |
| 5,353,417 | 10/1994 | Fuoco et al. | 395/306 |
| 5,396,602 | 3/1995 | Amini et al. | 395/293 |
| 5,398,244 | 3/1995 | Mathews et al. | 370/85.6 |
| 5,548,730 | 8/1996 | Young et al. | 395/280 |

*Primary Examiner*—Alpesh M. Shah
*Attorney, Agent, or Firm*—Blakely, Sokoloff, Taylor & Zafman

[57] ABSTRACT

A multi-functional device that integrates a high performance processor into a PCI to PCI bus bridge. The invention consolidates a high performance processor, a PCI to PCI bus bridge, PCI bus-processor address translation unit, direct memory acces's (DMA) controller, memory controller, secondary PCI bus arbitration unit, inter-integrated circuit (I$^2$C) bus interface unit, advanced programmable interrupt (APIC) bus interface unit, and a messaging unit into a single system which utilizes a local memory. The PCI bus is an industry standard high performance, low latency system bus. The PCI to PCI bridge provides a connection path between two independent 32-bit PCI buses and provides the ability to overcome PCI electrical loading limits. The addition of the local processor brings intelligence to the PCI bus bridge.

26 Claims, 10 Drawing Sheets

ARCHITECTURE FOR AN I/O PROCESSOR THAT INTEGRATES A PCI TO PCI BRIDGE

This is a continuation of application Ser. No. 08/489,654 filed Jun. 15, 1995, now abandoned.

BACKGROUND OF THE INVENTION

1. Field of the Invention

The present invention pertains to the field of computer system architecture. More particularly, this invention relates to an intelligent bus bridge for implementing intelligent input/output subsystems in computer and server systems.

2. Background

High performance computer systems commonly include separate input/output subsystems. Such input/output subsystem typically includes a microprocessor that performs input/output functions which is separate from what may be referred to as the host or main microprocessor. For example, such input/output subsystem may perform complex communication network interface functions or disk control functions for the computer system.

Typically, an input/output subsystem includes a set of specialized input/output devices coupled for communication over a component bus. A processor in such an input/output subsystem typically performs the input/output functions via a bus without interfering with operations by other processors in the computer system. Such isolation of input/output transactions on the bus typically enables improved performance by the main processor or processors in such a computer system. Such architecture is common in mainframe computer systems where the processor and the input/output subsystem is referred to as an I/O channel.

With the advent of computer systems utilizing microprocessors, especially server/client systems, the demand for more powerful microprocessors has been increasing to enable more powerful server/client systems. This need has been partially met by combining multiple microprocessors in a single system 11 as shown in FIG. 1. Another problem which exists as more I/O devices are needed to implement more powerful server/client systems is that standard component buses that couple input/output subsystems to other elements of the computer system typically impose electrical loading limitations. Such electrical loading limitations impose limits on the number of components coupled to the standard component bus. For example, one prior art bus standard requires that each connector on a system component interconnect bus presents only one electrical load. Such electrical loading limitations ensure that signal quality on a fully loaded bus is sufficient for reliable operation.

In this connection, since some input/output subsystems require a large number of components that communicate via a local component bus which may exceed the electrical loading requirements imposed on each connector of a standard component bus, an input/output subsystem may also include a bus bridge circuit 13 that couples the local component bus 17 to other component buses 19 in the computer system which connect to a network such as a LAN through a network I/O card 21 or storage devices through SCSI controllers 23. Such a bus bridge electrically isolates the microprocessor or microprocessors 25, the memory 27 and the components of the input/output subsystem from the other component buses. Such a bus bridge circuit enables the input/output subsystem to contain a large number of components required to implement input/output functions while meeting electrical loading requirements on other component buses.

Moreover, the microprocessor or processors in system 11 must typically contend with other bus agents coupled to the component bus. Such bus contentions typically reduce the performance of the microprocessor or microprocessors while performing the input/output functions for the input/output subsystem.

SUMMARY OF THE INVENTION

The present invention is a multi-functional device that integrates a high performance processor into a PCI to PCI bus bridge (P2P). Referring now to FIG. 2, the invention consolidates a high performance processor, such as an 80960 JF processor available from Intel Corporation (the local processor), a PCI to PCI bus bridge 32, PCI bus-processor address translation unit, direct memory access (DMA) controller, memory controller, secondary PCI bus arbitration unit, inter-integrated circuit ($I^2C$) bus interface unit, advanced programmable interrupt (APIC) bus interface unit, and a messaging unit into a single system 31 which utilizes a local memory 33. It is an integrated processor that addresses the needs of intelligent I/O applications and helps reduce intelligent I/O system costs.

The PCI bus is an industry standard (PCI Local Bus Specification, Revision 2.1), high performance, low latency system bus. The PCI to PCI Bridge provides a connection path between two independent 32-bit PCI buses and provides the ability to overcome PCI electrical loading limits. The addition of the local processor brings intelligence to the PCI bus bridge. The local processor and other functional blocks shown with dashed box 31 in FIG. 3 illustrate a block diagram of what will hereinafter be referred to as the P2P processor.

The P2P processor is a multi-function PCI device. Function 0 is the PCI to PCI bridge unit. Function 1 is the address translation unit. The P2P processor contains PCI configuration space accessible through the primary PCI bus.

In the preferred embodiment, the local processor 34 is an 80960 JF processor which is a member of the Intel i960 microprocessor family. The 80960 JF processor is implemented without functional modification in the P2P processor. The i960 Jx Microprocessor User's Manual available from Intel Corporation provides further details although all information concerning the local processor needed to practice the invention is provided herein.

The local processor operates out of its own 32-bit address space and not PCI address space. Memory on the local processor bus can be:

made visible to the PCI address space
kept private to the local processor
combination of the two.

Local Processor Bus 41

The local processor bus connects to P2P processor I/O pins to provide bus access to external devices. The P2P processor provides support for local bus arbitration.

Address Translation Units 43a and 43b and Messaging Unit 45

The address translation unit allows PCI transactions direct access to the local processor local memory 33. The local processor 34 has direct access to both PCI buses. Address translation is provided for transactions between the PCI address space and local processor address space. Address translation is controlled through programmable registers accessible from both the PCI interface and the local processor which allow flexibility in mapping the two address spaces. A messaging unit 45 provides a mechanism for data to be transferred between the PCI system and the local processor and notifying the respective system of the arrival of new data through an interrupt. The messaging unit can be used to send and receive messages.

PCI to PCI Bridge Unit 32

The PCI to PCI Bridge Unit connects two independent PCI buses. The bridge allows certain bus transactions on one PCI bus to be forwarded to the other PCI bus. It also allows fully independent PCI bus operation, including independent clocks. Dedicated data queues support high performance bandwidth on the PCI buses. PCI 64-bit Dual Address Cycle (DAC) addressing is supported.

The PCI to PCI bridge has dedicated PCI configuration space that is accessible through the primary PCI bus.

The PCI to PCI bridge in the P2P processor is fully compliant with the PCI to PCI Bridge Architecture Specification, Rev. 1.0 published by the PCI Special Interest Group.

Private PCI Devices

The P2P processor, by design, explicitly supports private PCI devices that can use the secondary PCI bus yet avoid detection by the PCI configuration software. The PCI to PCI bridge 32 and the secondary address translation unit 43b work together to hide private devices from PCI configuration cycles and to allow these devices to utilize a private PCI address space. These devices can be configured by the secondary address translation unit through normal PCI configuration cycles.

Integrated Memory Controller 47

The integrated memory controller provides direct control for external memory systems. Support is provided for DRAM, SRAM, ROM, and Flash Memory. The integrated memory controller provides a direct connect interface to memory 33 that usually does not require external logic. It features programmable chip selects, a wait state generator, and byte parity.

The external memory can be configured as PCI addressable memory or as private local processor memory.

DMA Controller 51a and 51b

The DMA Controller allows low-latency, high-throughput data transfers between PCI bus agents and local memory.

There are three separate DMA channels to accommodate data transfers. Two channels are dedicated to primary PCI bus data transfers and one channel is dedicated to secondary PCI bus data transfers. The DMA Controller supports chaining and unaligned data transfers. It is programmable only through the local processor 34.

Secondary PCI Arbitration Unit 53

The Secondary PCI Arbitration Unit provides PCI arbitration for the secondary PCI Bus. A fairness algorithm with programmable priorities is implemented. Six PCI Request and Grant signal pairs are provided. The arbitration unit may be disabled to allow for external arbitration.

Internal PCI and Local Bus Arbitration Units 55a, 55b and 57

The P2P processor contains two internal arbitration units which control access to the internal PCI buses within the device, namely the primary internal PCI arbitration unit 55a which arbitrates for the primary bridge interface, the primary ATU, DMA Channel 0, and DMA Channel 1. The secondary internal PCI arbitration unit 55b arbitrates for the secondary bridge interface, the secondary ATU, and DMA Channel 2. Each internal PCI arbitration unit uses a fixed round-robin arbitration scheme with each device on a bus having equal priority.

The P2P processor also requires an arbitration mechanism to control local bus ownership. The local bus arbitration unit (LBAU) 57 implements a fairness algorithm which allows every bus master the opportunity to gain control of the local bus. The algorithm 10 combines a round-robin scheme with a prioritizing mechanism.

$I^2C$ Bus Interface Unit 61

The $I^2C$ (Inter-Integrated Circuit) Bus Interface Unit allows the local processor to serve as a master and slave device residing on the $I^2C$ bus. The $I^2C$ bus is a serial bus developed by Philips Corporation consisting of a two pin interface. The bus allows the P2P processor to interface to other $I^2C$ peripherals and microcontrollers for system management functions. It requires a minimum of hardware for an economical system to relay status and reliability information on the I/O subsystem to an external device.

AZIC Bus Interface Unit 63

The APIC bus interface unit provides an interface to the three-wire Advanced Programmable Interrupt Controller (APIC) bus that allows I/O APIC emulation in software. Interrupt messages can be sent on the bus and EOI messages can be received.

Interrupt Routing 67

Four PCI interrupt inputs are provided which can be routed to either local processor interrupt inputs or to PCI Interrupt output pins.

TERMINOLOGY AND CONVENTIONS

Representing Numbers

All numbers set forth herein are base 10 unless designated otherwise. In text, numbers in base 16 are represented as "nnnH", where the "H" signifies hexadecimal. Binary numbers are shown with the subscript 2.

Fields

A preserved field in a data structure is one that the processor does not use. Preserved fields can be used by software; the processor will not modify such fields.

A reserved field is a field that may be used by an implementation. If the initial value of a reserved field is supplied by software, this value must be zero. Software should not modify reserved fields or depend on any values in reserved fields.

A read only field can be read to return the current value. Writes to read only fields are treated as no-op operations and will not change the current value nor result in an error condition.

A read/clear field can also be read to return the current value. A write to a read/clear field with the data value of 0 will cause no change to the field. A write to a read/clear field with a data value of 1 will cause the field to be cleared (reset to the value of 0). For example, if a read/clear field has a value of F0H, and a data value of 55H is written, the resultant field will be A0H.

Terminology

To aid the discussion of the P2P architecture, the following terminology is used:

| | |
|---|---|
| Downstream | At or toward a PCI bus with a higher number (after configuration) |
| DWORD | 32-bit data word |
| Host processor | Processor located upstream from the P2P processor |
| Local bus | Local processor bus |
| Local memory | Memory subsystem on the local bus |
| Upstream | At or toward a PCI bus with a lower number (after configuration) |

DETAILED DESCRIPTION OF THE INVENTION

Figure 1:
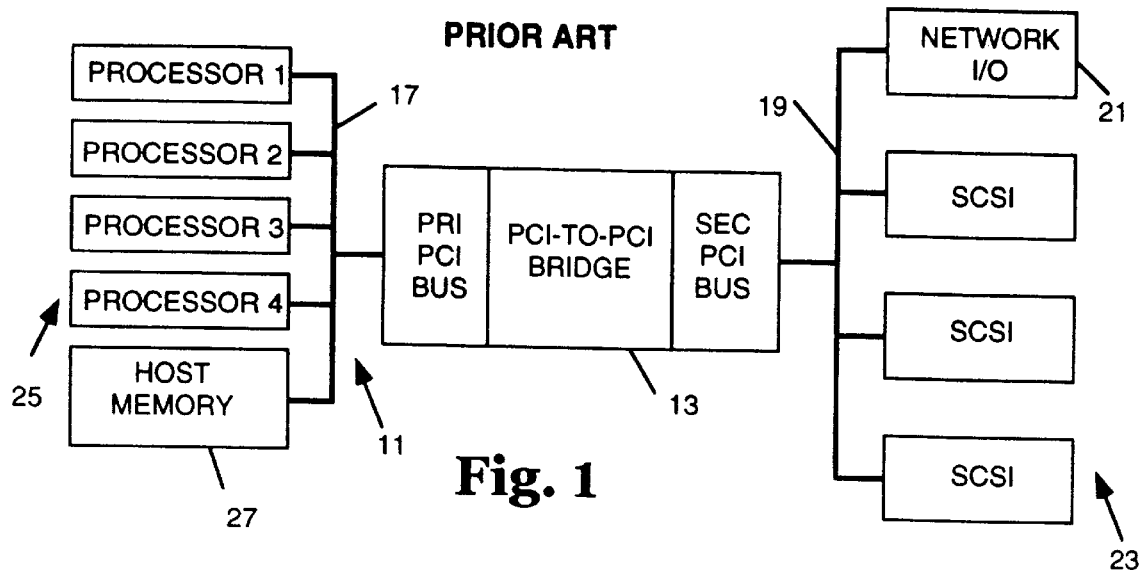
FIG. 1 is a block diagram showing a system using a prior art PCI to PCI bridge.
Figure 2:
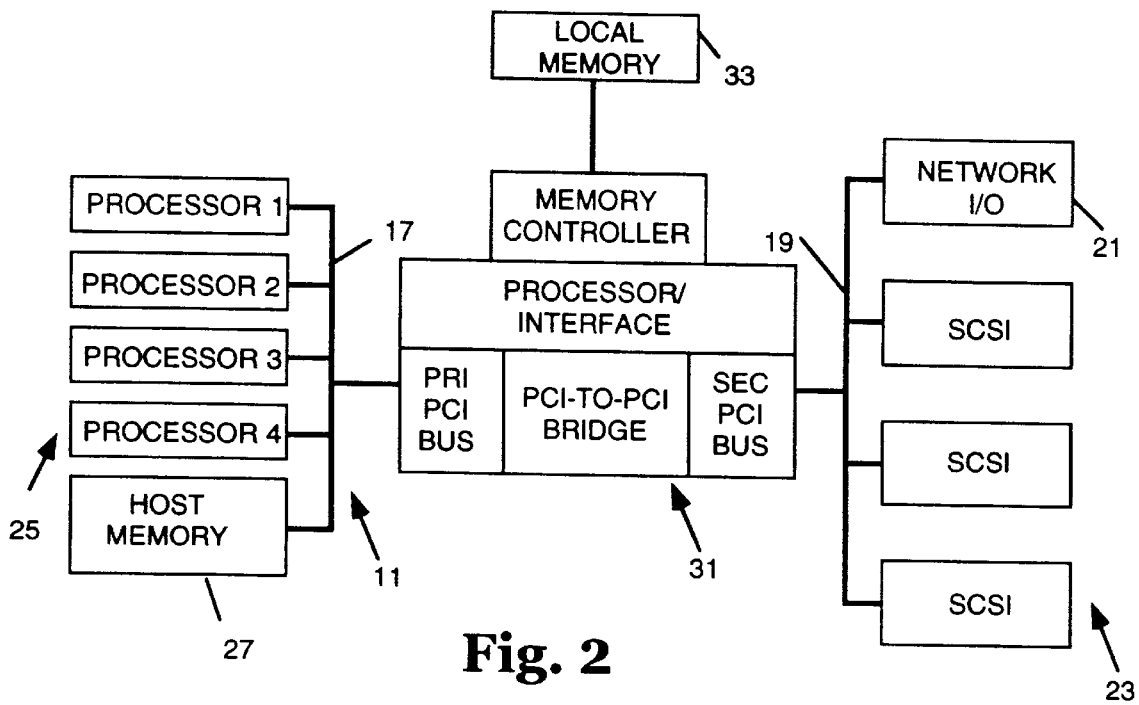
FIG. 2 is a block diagram showing a system using the invented PCI to PCI bridge with processor according to the present invention.
Figure 3:
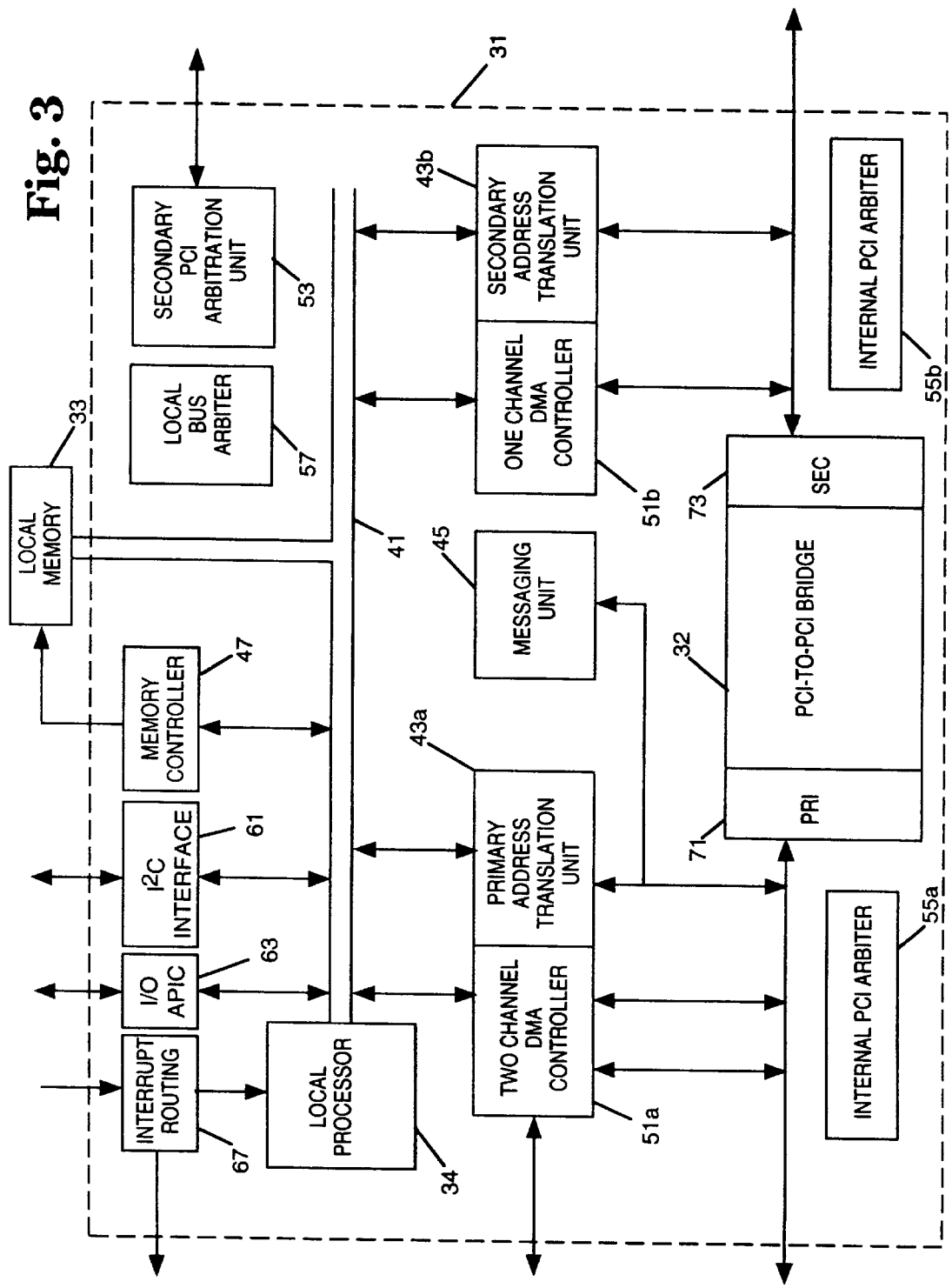
FIG. 3 is a block diagram showing the invented P2P processor.

The invention will now be described in terms of its functional blocks as set forth in FIG. 3.

Local Processor

The following is a description of the 80960 JF microprocessor used as the local processor in the P2P processor. It describes how the 80960 JF processor is configured or otherwise different from the description of the part in the i960 Jx Microprocessor User's Manual.

Overview

The 80960 JF processor is implemented without functional changes in the P2P processor, i.e. no internal logic is altered. Refer to the i960 Jx Microprocessor User's Manual for more details about the 80960 JF processor.

Features

The basic features of the 80960 JF processor are as follows:

High performance instruction execution core

4-Kbyte 2-way set associative instruction cache

2-Kbyte direct mapped data cache

Thirty-two 32-bit integer registers

Programmable bus controller

1-Local register Data RAM

Local register cache, providing storage for up to 8 local register sets

Advanced interrupt controller

Two 32-bit Timers

Differences

The following is a description of system design decisions made that impact the 80960 JF processor as used in the P2P processor.

Memory Regions

Because the P2P processor Peripheral Memory-Mapped Registers are 32-bits wide, Memory Region 0 and 1 must be designated a 32-bit region. Therefore, the PMCON0$_{-1}$ register must have the Bus Width bits set to 102 indicating a 32-bit wide bus.

Bus

To achieve optimal performance from DMA accesses, bus masters on the local bus other than the local processor are allowed to have unlimited burst lengths on the local processor bus. The address, however, will not increment for bursts longer than 4 words. This implies that memory controllers on the local bus must increment the address for each access in a burst.

PCI TO PCI Bridge Unit

Overview

The PCI to PCI bridge unit 32 is a device that allows the extension of a PCI Bus beyond its limited physical constraint of 10 electrical PCI loads. The bridge unit uses the concept of hierarchical busses where each bus in the hierarchy is electrically a separate entity but where all buses within the hierarchy are logically one bus. The PCI to PCI bridge unit does not increase the bandwidth of a PCI bus, it only allows that bus to be extended for applications requiring more I/O components than PCI electrical specifications allow.

The PCI to PCI bridge unit provides:

Independent 32-bit primary and secondary PCI buses with support for concurrent operations in either direction;

Separate memory and I/O address spaces on the secondary side of the bridge;

Two 64 byte posting buffers for both upstream and downstream transactions;

VGA palette snooping and VGA compatible addressing on the secondary bus;

64-bit addressing mode from the secondary PCI interface;

Private device configuration and address space for private PCI devices on the secondary PCI bus;

Special mode of operation that allows for positive decoding on the primary and secondary interfaces.

Theory Of Operation

The bridge unit operates as an address filter unit between the primary and the secondary PCI buses. PCI supports three separate address spaces:

Four Gbyte memory address space

64 Kbyte I/O address space (with 16-bit addressing)

Separate configuration space

Figure 4:
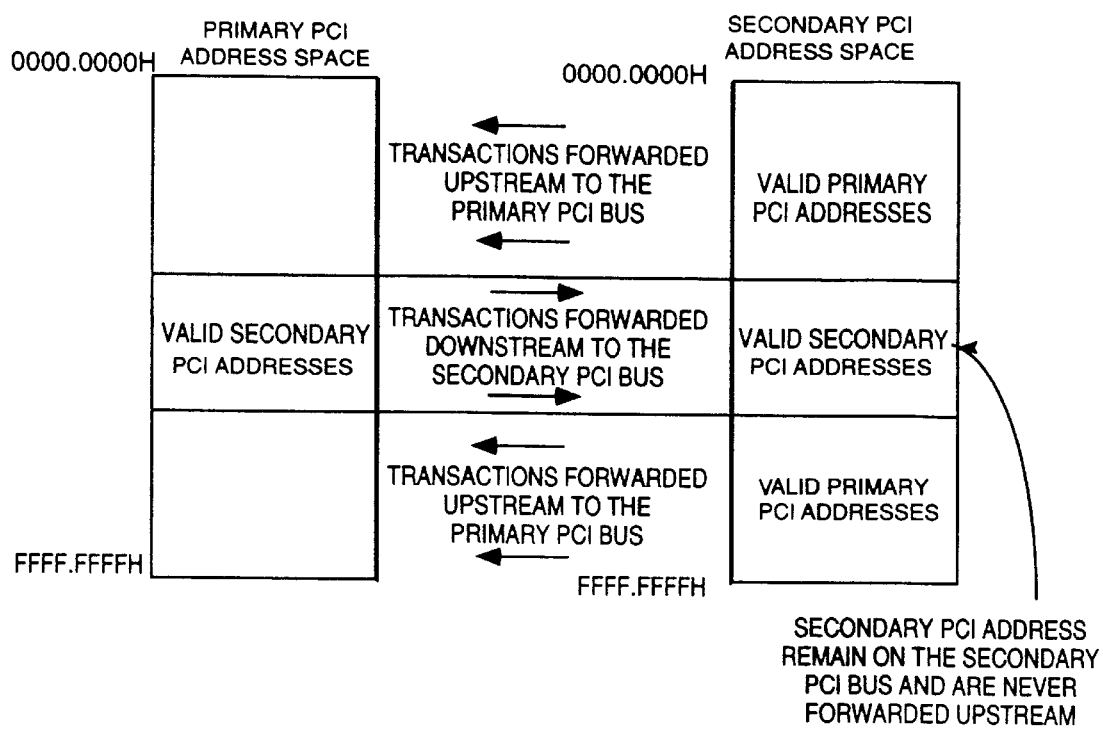
FIG. 4 shows the directions in which transactions flow between the primary and secondary address spaces of the PCI to PCI bridge.

A PCI to PCI bridge is programmed with a contiguous range of addresses within the memory and I/O address spaces, which then become the secondary PCI address space. Any address present on the primary side of the bridge which falls within the programmed secondary space is forwarded from the primary to the secondary side while addresses outside the secondary space are ignored by the bridge. The secondary side of the bridge works in reverse of the primary side, ignoring any addresses within the programmed secondary address space and forwarding any addresses outside the secondary space to the primary side as shown in FIG. 4.

The primary and secondary interfaces of the PCI bridge each implement PCI 2.1 compliant master and target devices. A PCI transaction initiated on one side of the bridge will address the initiating bus bridge interface as a target and the transaction will be completed by the target bus interface operating as a master device. The bridge is transparent to PCI devices on either side.

The PCI to PCI bridge unit of the P2P processor adheres, at a minimum, to the required features found in the PCI to PCI Bridge Architecture Specification Revision 1.0 and the PCI Local Bus Specification Revision 2.1. The following is a description of the bridge functionality and will refer to the PCI to PCI Bridge and PCI Bus Specifications where appropriate.

Architectural Description

Figure 5:
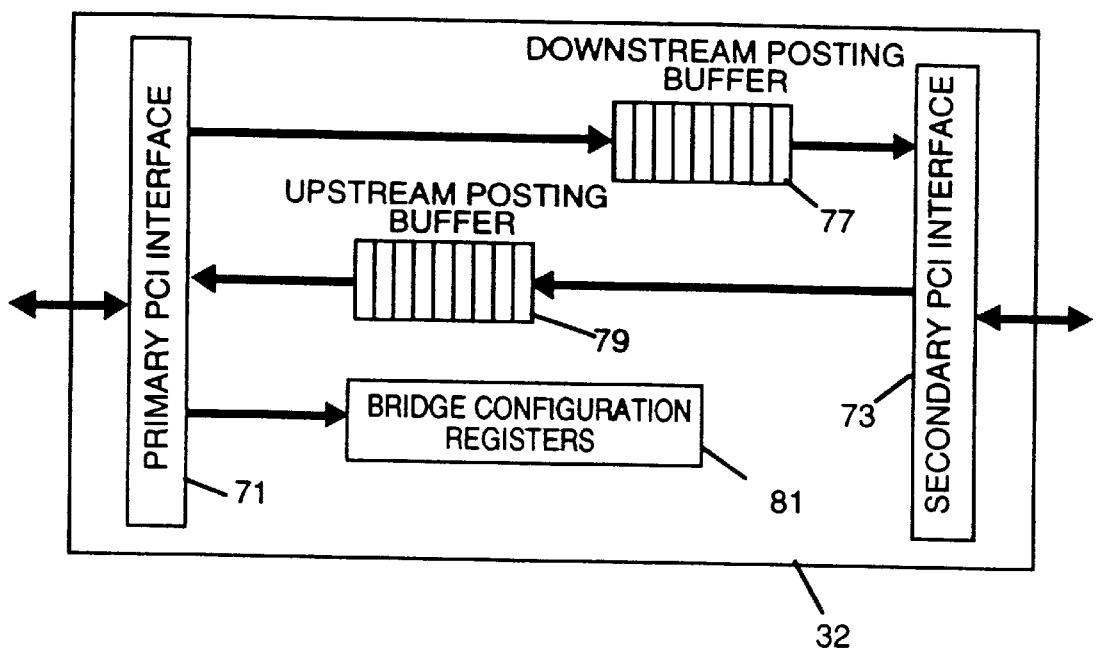
FIG. 5 is a block diagram of the PCI to PCI bridge.

The PCI to PCI bridge unit can be logically separated into four major components as follows:

Primary PCI Interface
Secondary PCI Interface
Posting Buffers
Configuration Registers The block diagram of the bridge in FIG. 5 shows these major functional units.

Primary PCI Interface

The primary PCI interface 71 of the PCI to PCI bridge unit can act either as a target or an initiator of a PCI bus transaction. For most systems, the primary interface will be connected to the PCI side of a Host/PCI bridge which is typically the lowest numbered PCI bus in a system hierarchy. The primary interface consists of the mandatory 50 signal pins defined within the PCI to PCI Bridge Architecture Specification Revision 1.0 and four optional interrupt pins.

The primary PCI interface implements both an initiator (master) and a target (slave) PCI device. When a transaction is initiated on the secondary bus, the primary master state machine, which is described in the PCI Local Bus Specification Revision 2.1, completes the transaction (write or read) as if it was the initiating device. The primary PCI interface, as a PCI target for transactions that need to complete on the secondary bus, accepts the transaction and forward the request to the secondary side. As a target, the primary PCI interface uses positive decoding to claim the PCI transaction addressed below the bridge and then forward the transaction onto the secondary master interface.

The primary PCI interface is responsible for all PCI command interpretation, address decoding and error handling.

PCI configuration for the primary and secondary interfaces, interrupt routing logic (described below), secondary PCI bus arbitration (described below) is completed through the primary interface. Configuration space registers support these functions.

Secondary PCI Interface

The secondary PCI interface 73 of the PCI to PCI bridge unit functions in almost the same manner as the primary interface. It includes both a PCI master and a PCI slave device and implements the "second" PCI bus with a new set of PCI electrical loads for use by the system. The secondary PCI interface consists of the mandatory 49 pins. S_RST# is an output instead of an input on the secondary side.

As a slave (target), the secondary PCI interface is responsible for claiming PCI transactions that do not fit within the bridge's secondary memory or I/O address space and forwarding them up the bridge to the master on the primary side. As a master (initiator), the secondary PCI interface is responsible for completing transactions initiated on the primary side of the bridge. The secondary PCI interface uses inverse decoding of the bridge address registers and only forwards addresses within the primary address space across the bridge.

The secondary PCI interface also implements a separate address space for private PCI devices on the secondary bus where it ignores and does not forward a range of primary addresses defined at configuration time by the local processor.

As a special mode of operation, the secondary PCI interface performs positive address decoding based upon its own set of memory and I/O address registers. This mode of operation is enabled through the Secondary Decode Enable Register (SDER) and has a side effect of disabling the inverse decoding of the standard bridge address registers on the secondary interface.

Posting Buffers

To hide the latency incurred in the arbitration and acquisition of a PCI target during read and write transactions to the opposite side of the bridge, the PCI to PCI bridge unit implements two 64 byte posting buffers 77 and 79. The bridge supports both Delayed and Posted transactions.

In a Delayed transaction, the information required to complete the transaction is latched and the transaction is terminated with a Retry. The bridge then performs the transaction on behalf of the initiator. The initiator is required to repeat the original transaction that was terminated with a Retry in order to complete the transaction.

In a Posted transaction, the transaction is allowed to complete on the initiating bus before completing on the target bus.

Delayed and Posted transactions are discussed in detail below.

The bridge uses two posting buffers:

downstream posting buffer 77 for data flowing from the primary interface to the secondary interface upstream posting buffer 79 for data flowing from the secondary interface to the primary interface Each buffer has associated address/control registers to maintain information about the transaction.

Configuration Registers

Every PCI device implements a separate configuration address space and configuration registers 81. The first 16 bytes of the bridge configuration header format implement the common configuration registers required by all PCI devices. The value in the read-only Header Type Register defines the format for the remaining 48 bytes within the header and returns a 01H for a PCI to PCI bridge.

Devices on the primary bus can only access the PCI to PCI bridge configuration space with Type 0 configuration commands. Devices on the secondary PCI bus can not access bridge configuration space with PCI configuration cycles. The configuration registers hold all the necessary address decode, error condition and status information for both sides of the bridge.

Address Decoding

The P2P processor provides three separate address ranges that are used to determine which memory and I/O addresses are forwarded in either direction across the bridge portion of the P2P processor. There are two address ranges provided for memory transactions and one address range provided for I/O transactions. The bridge uses a base address register and limit register to implement an address range. The address ranges are positively decoded on the primary interface with any address within the range considered a secondary address and therefore capable of being forwarded downstream across the bridge. On the secondary interface, the address ranges are inversely decoded. This means that any address outside the programmed address ranges is capable of being forwarded upstream through the bridge.

Standard bridge unit address decoding can also be modified by the Secondary Decode Enable Register (SDER). The bits within this register enable positive address decoding by the secondary bridge interface and disable the basic inverse address decoding used by PCI to PCI bridges.

I/O Address Space

The PCI to PCI bridge unit implements one programmable address range for PCI I/O transactions. A continuous I/O address space is defined by the I/O Base Register (IOBR) and the I/O Limit Register (IOLR) in the bridge configuration space. The upper four bits of the IOBR correspond to AD[15:12] of the I/O address and the lower twelve bits are always 000H forcing a 4 Kbyte alignment for the I/O address space. The upper four bits if the IOLR also correspond to AD[15:12] and the lower twelve bits are FFFH forcing a granularity of 4 Kbytes.

The bridge unit will forward from the primary to secondary interface an I/O transaction that has an address within the address range defined (inclusively) by the IOBR and the IOLR. In this instance the primary interface acts as a PCI target and the secondary interface acts as a PCI initiator for the bridged I/O transaction.

If an I/O read or write transaction is present on the secondary bus, the bridge unit forwards it to the primary interface if the address is outside the address range defined by IOBR and IOLR. In this instance the secondary interface acts as a PCI target and the primary interface serves as a PCI initiator.

The P2P processor only supports 16-bit addresses for I/O transactions and therefore any I/O transaction with an address greater than 64 Kbytes will not be forwarded over either interface. The bridge assumes AD[31:16] =0000H even though these bits are not implemented in the IOBR and the IOLR. The bridge unit must still perform a full 32-bit decode during an I/O transaction to check for AD[31:16] =0000H per the PCI Local Bus Specification.

ISA Mode

The PCI to PCI bridge unit of the P2P device implements an ISA Mode bit in the Bridge Control Register (BCR) to provide ISA-awareness for ISA I/O cards on subordinate PCI buses. ISA Mode only affects I/O addresses within the address range defined by the IOBR and IOLR registers. When ISA Mode is enabled by setting the ISA Mode bit, the bridge will filter out and not forward I/O transactions with addresses in the upper 768 bytes (300H) of each naturally aligned 1 Kbyte block. Conversely, I/O transactions on the secondary bus will inversely decode the ISA addresses and therefore forward I/O transactions with addresses in the upper 768 bytes of each naturally aligned 1 Kbyte block.

Memory Address Space

The PCI to PCI bridge unit supports two separate address ranges for forwarding memory accesses downstream from the primary to secondary interfaces. The Memory Base Register (MBR) and the Memory Limit Register (MLR) define one address range and the Prefetchable Memory Base Register (PMBR) and the Prefetchable Limit Register (PMLR) define the other address range. The prefetchable address range is used in determining which memory spaces are capable of prefetching without side effects. Both register pairs determine when the bridge will forward Memory Read, Memory Read Line, Memory Read Multiple, Memory Write, and Memory Write and Invalidate transactions across the bridge. In the case where the two register pairs overlap, one address range results that is the summation of both registers combined with the prefetchable range having priority over bridge read transaction response.

The upper twelve bits of the MBR, MLR, PMBR, PMLR registers correspond to address bits AD[31:20] of a primary or a secondary memory address. For decoding purposes, the bridge assumes that AD[19:0] of both memory base registers are 00000H and that AD[19:0] of both memory limit registers are FFFFFH. This forces the memory address ranges supported by the bridge unit to be aligned on 1 Mbyte boundaries and to have a size granularity of 1 Mbyte. The lower four bits in all four registers are read only and return zero when read.

Any PCI memory transaction (not I/O) present on the primary bus that falls inside the address ranges defined by the two register pairs (MBR-MLR and PMBR-PMLR) will be forwarded downstream across the bridge from the primary to secondary interface. The secondary master interface will always use the same PCI command type on the secondary bus that was claimed by the primary slave interface on the primary bus (except for certain cases during Memory Write and Invalidate). All dual address cycles (PCI transactions with 64-bit address) are always claimed by the secondary interface.

Any PCI memory transaction present on the secondary bus that falls outside the address range defined by the two register pairs (MBR-MLR and PMBR-PMLR) will be forwarded upstream across the bridge from the secondary to primary interface. The secondary interface will forward all dual address cycles from the secondary bus to the primary bus. Dual address cycles are constrained to the upper 4 Gbytes of the 64-bit address space.

The bridge response to memory transactions on either interface may be modified by the following register bits from the bridge configuration space:

Master Enable bit in the Primary Command Register (PCMD)

Memory Enable bit in the Primary Command Register (PCMD)

VGA Enable bit in the Bridge Control Register (BCR)

Secondary Positive Memory Decode Enable bit in the Secondary Decode Enable Register (SDER)

The Secondary Positive Memory Decode Enable bit in the SDER modifies secondary address decoding. It enables an address range register pair, Secondary Memory Base Register (SMBR) and Secondary Memory Limit Register (SMLR), that define an address window for claiming memory transactions on the secondary bus and forwarding through the bridge. The decoding and transaction claiming works in the same manner as positive decoding on the primary bus for the MBR/MLR and PMBR/PMLR address pairs. The Secondary Positive Memory Decode Enable bit also disables the inverse decoding performed on the secondary interface that claims memory transactions with addresses outside the MBR/MLR and PMBR/PMLR address ranges. Inverse decoding is never performed on the primary interface on behalf of the MBR/MLR and PMBR/PMLR address pairs.

64-Bit Address Decoding-Dual Address Cycles

The bridge unit supports the dual address cycle command for 64-bit addressing on the secondary interface of the bridge unit only. Dual address cycles allow 64-bit addressing by using two PCI address phases; the first one for the lower 32 bits and the second one for the higher 32 bits.

The bridge unit typically decodes and forwards all dual address cycles from the secondary to the primary interface regardless of the address ranges defined in the MBR/MLR and PMBR/PMLR register pairs. Dual address cycles will not be forwarded if the Secondary Subtractive Decoding Enable bit in the SDER is set.

The bridge unit will use Subtractive Decode timing (assert DEVSEL# on the fifth clock after FRAME# is asserted) for claiming dual address cycles. This allows other agents on the secondary PCI bus to claim dual address cycles before the bridge unit.

The primary interface will not forward dual address cycles.

The mechanism for holding and forwarding the high order 32 bits of a 64-bit address is the addition of 32-bit address registers associated with the secondary to primary data path. These registers will store the high order 32 bits of a 64-bit address that is transmitted during the second address phase of a dual address cycle. In addition, the master and slave state machines must be able to support the dual address cycle and the DAC command.

The response to DAC cycles on the secondary interface may be modified by the following register bits from the bridge configuration space:

the Master Enable bit in the Primary Command Register (PCMD)

the Memory Enable bit in the Primary Command Register (PCMD)

The Memory Enable bit in the PCMD register must be set to allow the bridge to enable the bridge to respond to any kind of memory cycle, 32 or 64 bit. The Master Enable bit in the PCMD must be set to allow the primary interface to master PCI transactions.

BRIDGE OPERATION

The bridge unit of the P2P processor is capable of forwarding all types of memory, I/O and configuration commands from one PCI interface to the other PCI interface. Table 1 defines the PCI commands supported and not supported by the PCI to PCI bridge unit and its two PCI interfaces. PCI commands are encoded within the C/BE [3:0]# pins on either interface. To prevent deadlock due to two different interfaces, the bridge gives priority to the primary interface when transactions occur on both interfaces simultaneously.

The secondary PCI interface must adhere to the definition of a PCI master and slave device as defined within the PCI Local Bus Specification and the PCI to PCI Bridge Architecture Specification.

Posting Buffers

The PCI to PCI bridge unit has two posting buffers that are used for both Delayed transactions and Posted transactions. The downstream posting buffer 77 is in the data path from the primary interface to the secondary interface. The upstream posting buffer 79 is in the data path from the secondary interface to the primary interface. FIG. 5 shows the two posting buffers between the primary and secondary interfaces.

The downstream posting buffer is used by:

Posted Writes from the primary bus

Delayed Write Requests from the primary bus

Delayed Read Completions returning to the secondary bus

Delayed Write Completions returning to the secondary bus

The upstream posting buffer is used by:

Posted Writes from the secondary bus

Delayed Write Requests from the secondary bus

Delayed Read Completions returning to the primary bus

TABLE 1

PCI Commands

| C/BE # | PCI Command | Initiator: Primary Bus Target: Secondary Bus | Initiator: Secondary Bus Target: Primary Bus |
|---|---|---|---|
| $0000_2$ | Interrupt Acknowledge | Ignore | Ignore |
| $0001_2$ | Special Cycle | Ignore | Ignore |
| $0010_2$ | I/O Read | Forward | Forward |
| $0011_2$ | I/O Write | Forward | Forward |
| $0100_2$ | Reserved | Ignore | Ignore |
| $0101_2$ | Reserved | Ignore | Ignore |
| $0110_2$ | Memory Read | Forward | Forward |
| $0111_2$ | Memory Write | Forward | Forward |
| $1000_2$ | Reserved | Ignore | Ignore |
| $1001_2$ | Reserved | Ignore | Ignore |
| $1010_2$ | Configuration Read | Forward | Forward |
| $1011_2$ | Configuration Write | Forward | Forward |
| $1100_2$ | Memory Read Multiple | Forward | Forward |
| $1101_2$ | Dual Address Cycle | Ignore | Forward |
| $1110_2$ | Memory Read Line | Forward | Forward |
| $1111_2$ | Memory Write and Invalidate | Forward | Forward |

PCI Interfaces

The P2P bridge unit has a primary PCI interface and a secondary PCI interface. When transactions are initiated on the primary bus and claimed by the bridge, the primary interface serves as a PCI target device and the secondary interface serves as an initiating device for the true PCI target on the secondary bus. The primary bus is the initiating bus and the secondary bus is the target bus. The sequence is reversed for transactions initiated on the secondary bus. The interfaces are defined below.

Primary Interface

The primary PCI interface 71 of the bridge unit is the interface connected to the lower numbered PCI bus between the two PCI buses that the P2P device bridges.

The primary PCI interface must adhere to the definition of a PCI master and slave device as defined within the PCI Local Bus Specification and the PCI to PCI Bridge Architecture Specification.

Secondary Interface

The secondary PCI interface 73 of the bridge unit is the interface connected to the higher numbered PCI bus between the two PCI buses that the P2P device bridges.

Delayed Write Completions returning to the primary bus

Write posting allows the bridge to achieve its full bandwidth potential while hiding the latency associated with traveling through the bridge and the latency associated with acquiring the target bus. The two sets of posting buffers can be used simultaneously.

Posting Buffer Organization

Each posting buffer can hold 64 bytes of data organized in 16 entries of 4 bytes each (16 DWORDs). Each buffer can hold:

One Posted Write transaction of up to 64 bytes or

One Delayed Completion transaction up to 64 bytes or

One Delayed Write transaction up to 4 bytes

Associated with each posting buffer is an address register and a set of tag bits and valid bits.

The bridge can also store one Delayed Read Request outside of the posting buffer.

The internal addressing of the posting buffers is in a circular fashion such that when a transaction enters an empty buffer, it will be immediately forwarded to the top. No PCI clocks are required to move data from one entry in the buffer to the next.

Posting Buffer Operation

Both posting buffers are used to help the bridge achieve the full PCI bandwidth and to hide the latency of acquiring two PCI buses for every transaction crossing the bridge. The Posting Disable bit in the EBCR register must be clear to allow the buffers to post transactions.

The nature of the posting buffers allows for concurrent operations from the primary to secondary PCI interfaces and from the secondary to primary PCI interfaces. This means that transactions to opposite interfaces may occur on both PCI interfaces at the same time. From the moment a transaction is initiated to the bridge, the target interface attempts to gain mastership of the target bus. The mechanism used for this is the standard PCI arbitration mechanism used on the primary and the secondary interfaces.

As a default reset state, the posting buffers will be marked invalid. Any subsequent PCI reset event will force all the buffers to be cleared by being marked invalid.

Transaction Ordering Rules

Because the bridge can process multiple transactions, it must maintain proper ordering to avoid deadlock conditions and improve throughput. Table 2 contains the ordering rules for multiple transactions. The first row contains the transaction that has been accepted. The first column is the transaction that was just latched. The table indicates whether the new transaction can pass the previous accepted transaction (denoted as Yes), the new transaction can not pass the previous accepted transaction (No), or the new transaction should not be accepted (Do Not Accept). Transactions not accepted should be signaled a Retry.

TABLE 2

Transaction Passing

| Pass? | Pass accepted Posted Memory Write? | Pass accepted Delayed Read Request? | Pass accepted Delayed Write Request? | Pass accepted Delayed Read Completion? | Pass accepted Delayed Write Completion? |
|---|---|---|---|---|---|
| New Posted Memory Write | No | Yes | Yes | Yes | Yes |
| New Delayed Read Request | No | Do Not Accept | Do Not Accept | No | Yes |
| New Delayed Write Request | No | Do Not Accept | Do Not Accept | No | Yes |
| New Delayed Read Completion | No | Yes | Yes | Do Not Accept | Do Not Accept |
| New Delayed Write Completion | Yes | Yes | Yes | No | Do Not Accept |

Register Definitions

The PCI to PCI bridge configuration registers are described below. The configuration space consists of 8, 16, 24, and 32-bit registers arranged in a predefined format. The configuration registers are accessed through Type 0 Configuration Reads and Writes on the primary side of the bridge and through local processor local operations.

Each register other than those defined by the PCI Local Bus Specification and the PCI to PCI Bridge Architecture Specification is detailed in functionality, access type (read/write, read/clear, read only) and reset default condition. As stated, a Type 0 configuration command on the primary side with an active IDSEL or a memory-mapped local processor access is required to read or write these registers. The format for the registers with offsets up to 3EH are defined with the PCI to PCI Bridge Architecture Specification Rev. 1.0, and therefore, are not detailed herein. Registers with offsets greater than 3EH are implementation specific to the P2P processor.

An additional requirement exists to allow the local processor to access the bridge configuration space. Some registers that are read only from Type 0 Configuration Read and Write commands may be writable from the local processor. This allows certain configuration registers to be initialized before PCI configuration begins.

The local processor reads and writes the bridge configuration space as memory-mapped registers. Table 3 shows the register and its associated offset used in a PCI configuration command and its memory-mapped address in the local processor address space.

The assertion of the P_RST# signal on the primary side of the bridge affects the state of most of the registers contained within the bridge configuration space. Unless otherwise noted, all bits and registers will return to their stated default state value upon primary reset. The reset state of the secondary S_RST# output does not affect the state of the registers unless explicitly noted.

TABLE 3

PCI to PCI Bridge Configuration Register Addresses

| Register Name | Size in Bytes | Address Offset |
|---|---|---|
| Vendor ID Reqister - VIDR | 2 | 00H |
| Device ID Register - DIDR | 2 | 02H |
| Primary Command Register - PCMDR | 2 | 04H |
| Primary Status Register - PSR | 2 | 06H |
| Revision ID Register - RIDR | 1 | 08H |
| Class Code Register - CCR | 3 | 09H |
| Cacheline Size Register - CLSR | 1 | 0CH |
| Primary Latency Timer Register - PLTR | 1 | 0DH |
| Header Type Register - HTR | 1 | 0EH |

TABLE 3-continued

PCI to PCI Bridge Configuration Register Addresses

| Register Name | Size in Bytes | Address Offset |
|---|---|---|
| Primary Bus Number Register - PBNR | 1 | 18H |
| Secondary Bus Number Register - SBNR | 1 | 19H |
| Subordinate Bus Number Register - SubBNR | 1 | 1AH |
| Secondary Latency Timer Register - SLTR | 1 | 1BH |
| I/O Base Register - IOBR | 1 | 1CH |
| I/O Limit Register - IOLR | 1 | 1DH |
| Secondary Status Register - SSR | 2 | 1EH |
| Memory Base Register - MBR | 2 | 20H |
| Memory Limit Register - MLR | 2 | 22H |
| Prefetchable Memory Base Register - PMBR | 2 | 24H |
| Prefetchable Memory Limit Register - PMLR | 2 | 26H |
| Bridge Control Register - BCR | 2 | 3EH |
| Extended Bridge Control Register - EBCR | 2 | 40H |
| Secondary IDSEL Select Register - SISR | 2 | 42H |
| Primary Bridge Interrupt Status Register - PBISR | 4 | 44H |
| Secondary Bridge Interrupt Status Register - SBISR | 4 | 48H |
| Secondary Arbitration Control Register - SACR | 4 | 4CH |

TABLE 3-continued

PCI to PCI Bridge Configuration Register Addresses

| Register Name | Size in Bytes | Address Offset |
|---|---|---|
| PCI Interrupt Routing Select Register - PIRSR | 4 | 50H |
| Secondary I/O Base Register - SIOBR | 1 | 54H |
| Secondary I/O Limit Register - SIOLR | 1 | 55H |
| Secondary Memory Base Register - SMBR | 2 | 58H |
| Secondary Memory Limit Register - SMLR | 2 | 5AH |
| Secondary Decode Enable Register - SDER | 2 | 5CH |

As previously noted, the bits in the Vendor ID Register through the Bridge Control Register-BCR adhere to the definitions in the PCI Local Bus Specification, and, therefore need not be described herein. The following is a description of the registers added to the PCI Local Bus Specification to implement the PCI to PCI bridge according to the present invention. The added registers begin at an address offset of 40H as shown in Table 3.

Extended Bridge Control Register-EBCR

The Extended Bridge Control Register is used to control the extended functionality the bridge implements over the base PCI to PCI Bridge Architecture Specification. It has enable/disable bits for the extended functionality of the bridge.

TABLE 4a

Extended Bridge Control Register - EBCR

| Bit | Default | Read/Write | Description |
|---|---|---|---|
| 15:07 | $000000000_2$ | Read Only | Reserved |
| 06 | Varies with external state of CONFIG_MODE pin at primary PCI bus reset | Read/Write | Configuration Cycle Disable - When this bit is set, the primary PCI interface of the P2P Processor will respond to all configuration cycles with a Retry condition. When clear, the P2P Processor will respond to the appropriate configuration cycles. The default condition for this bit is based on the external state of the CONFIG_MODE pin at the rising edge of P_RST#. If the external state of the pin is high, the bit is set. If the external state of the pin is low, the pin is cleared. |
| 05 | $0_2$ | Read Only | Reserved |
| 04 | $0_2$ | Read Only | Reserved |
| 03 | Varies with external state of SYNC# mode pin at primary PCI bus reset | Read Only | Sync# Mode - Describes which of the three clocks are synchronous: Primary PCI Bus, Secondary PCI Bus, and Local Processor. If clear, all three clocks are synchronous. If set, the Primary PCI Bus clock is asynchronous with respect to the Secondary PCI Bus clock and the Local Processor clock. The default values for this bit are based on the external state of the SYNC# pin at the rising edge of P RST#. |

TABLE 4a-continued

Extended Bridge Control Register - EBCR

| Bit | Default | Read/Write | Description |
|---|---|---|---|
| 02 | $0_2$ | Read/Write | Reset Bridge - When the bit is set, the entire PCI to PCI bridge will be reset. All registers of the bridge will be set to their default values (except for secondary bus reset bit of the BCR), all state machines will be reset and all buffers will be cleared. The secondary reset bit in the BCR will be set in insure minimum PCI reset time. Software will be required to clear this bit to deassert the secondary bus reset. |
| 01 | Varies with external state of RST_MODE pin at primary PCI bus reset | Read/Write | Processor Reset- This bit will reset the local processor only without resetting the secondary side of the bridge. Setting this bit will place the processor into a reset state and keep it there. Software will be required to clear this bit to deassert local processor reset. The default condition for this bit is based on the external state of the RST_MODE pin at the rising edge of P_RST#. If the external state of the pin is high, the bit is set. If the external state of the pin is low, the bit is cleared. |
| 00 | $0_2$ | Read/Write | Posting Disable - If this bit is set, the bridge is not allowed to post write transactions from either bridge interface. All transactions are processed as Delayed transactions. If this bit is clear, the bridge is allowed to post write transactions. |

Primary Bridge Interrupt Status Register-PBISR

The Primary Bridge Interrupt Status Register is used to notify the local processor of the source of a Primary Bridge interface interrupt. In addition, this register is written to clear the source of the interrupt to the interrupt unit of the P2P processor. All bits in this register are Read Only from PCI and Read/Clear from the local bus.

Bits 4:0 are a direct reflection of bit 8 and bits 14:11 (respectively) of the Primary Status Register (these bits are set at the same time by hardware but need to be cleared independently). The conditions that result in a Primary Bridge interrupt are cleared by writing a 1 to the appropriate bits in this register.

TABLE 4b

Primary Bridge Interrupt Status Register - PBISR

| Bit | Default | Read/Write | Description |
|---|---|---|---|
| 31:05 | 0000000H | Read Only | Reserved |
| 04 | 02 | Read/Clear | P_SERR# Asserted - This bit is set if |

TABLE 4b-continued

Primary Bridge Interrupt Status Register - PBISR

| Bit | Default | Read/Write | Description |
|---|---|---|---|
| | | | P_SERR# is asserted on the primary PCI bus. |
| 03 | 02 | Read/Clear | PCI Master Abort - This bit is set whenever a transaction initiated by the primary master interface ends in a Master-abort. |
| 02 | 02 | Read/Clear | PCI Target Abort (master) - This bit is set whenever a transaction initiated by the primary master interface ends in a Master-abort. |
| 01 | 02 | Read/Clear | PCI Target Abort (target) - This bit is set whenever the primary interface, acting as a target, terminates the transaction on the PCI bus with a target abort. |
| 00 | 02 | Read/Clear | PCI Master Parity Error - The primary interface sets this bit when three conditions are met: 1) the bus agent asserted P_PERR# itself or observed P_PERR# asserted 2) the agent setting the bit acted as the bus master for the operation in which the error occurred 3) the parity error response bit (command register) is set |

Secondary Bridge Interrupt Status Register-SBISR

The Secondary Bridge Interrupt Status Register is used to notify the local processor of the source of a Secondary Bridge interface interrupt. In addition, this register is written to clear the source of the interrupt to the interrupt unit of the P2P processor. All bits in this register are Read Only from PCI and Read/Clear from the local bus.

Bits 4:0 are a direct reflection of bit 8 and bits 14:11 (respectively) of the Secondary Status Register (these bits are set at the same time by hardware but need to be cleared independently). The conditions that result in a Primary Bridge interrupt are cleared by writing a 1 to the appropriate bits in this register.

TABLE 4c

Secondary Bridge Interrupt Status Register - SBISR

| Bit | Default | Read/Write | Description |
|---|---|---|---|
| 31:05 | 0000000H | Read Only | Reserved |
| 04 | 02 | Read/Clear | P_SERR# Asserted - This bit is set if P_SERR# is asserted on the secondary PCI bus. |
| 03 | 02 | Read/Clear | PCI Master Abort - This bit is set whenever a transaction initiated by the secondary master interface ends in a Master-abort. |
| 02 | 02 | Read/Clear | PCI Target Abort (master) - This bit is set whenever a transaction initiated by the secondary master interface ends in a Master-abort. |
| 01 | 02 | Read/Clear | PCI Target Abort (target) - This bit is set whenever the secondary interface, acting as a target, terminates the transaction on the PCI bus with a target abort. |
| 00 | 02 | Read/Clear | PCI Master Parity Error - The secondary interface sets this bit when three conditions are met: 1) the bus agent asserted P_PERR# itself or observed P_PERR# asserted 2) the agent setting the bit acted as the bus master for the operation in |

TABLE 4c-continued

Secondary Bridge Interrupt Status Register - SBISR

| Bit | Default | Read/Write | Description |
|---|---|---|---|
| | | | which the error occurred 3) the parity error response bit (command register) is set |

Secondary IDSEL Select Register-SISR

The Secondary IDSEL Select Register controls the usage of S_AD[20:16] in Type 1 to Type 0 conversions from the primary to secondary interface. In default operation, a unique encoding on primary addresses P_AD[15:11] results in the assertion of one bit on the secondary address bus S_AD[31:16] during a Type 1 to Type 0 conversion. This is used for the assertion of IDSEL on the device being targeted by the Type 0 configuration command. This register allows secondary address bits S_AD[20:16] to be used to configure private PCI devices by forcing secondary address bits S_AD[20:16] to all zeros during Type 1 to Type 0 conversions, regardless of the state of primary addresses P_AD[15:11] (device number in Type 1 configuration command).

If any address bit within S_AD[20:16] is to be used for private secondary PCI devices, the local processor must guarantee that the corresponding bit in the SISR register is set before the host tries to configure the hierarchical PCI buses.

TABLE 4d

Secondary IDSEL Select Register - SISR

| Bit | Default | Read/Write. | Description |
|---|---|---|---|
| 04 | $0_2$ | Read/Write | AD20 - IDSEL Disable - When this bit is set, AD20 will be deasserted for any possible Type 1 to Type 0 conversion. When clear, AD20 will be asserted when primary addresses AD[15:11] = $00100_2$ during a Type 1 to Type 0 conversion. |
| 03 | $0_2$ | Read/Write | AD19 - IDSEL Disable - When this bit is set, AD19 will be deasserted for any possible Type 1 to Type 0 conversion. When clear, AD19 will be asserted when primary addresses AD[15:11] = $00011_2$ during a Type 1 to Type 0 conversion. |
| 02 | $0_2$ | Read/Write | AD18 - IDSEL Disable - When this bit is set, AD18 will be deasserted for any possible Type 1 to Type 0 conversion. When clear, AD18 will be asserted when primary addresses AD[15:11] = $00010_2$ during a Type 1 to Type 0 conversion. |
| 01 | $0_2$ | Read/Write | AD17 - IDSEL Disable - When this bit is set, AD17 will be deasserted for any possible Type 1 to Type 0 conversion. When clear, AD17 will be asserted when primary addresses AD[15:11] = $00001_2$ during a Type 1 to Type 0 conversion. |
| 00 | $0_2$ | Read/Write | AD16 - IDSEL Disable - When this bit is set, AD16 will be deasserted for any possible Type 1 to Type 0 conversion. When clear, AD16 will be asserted when primary addresses AD[15:11] = $00000_2$ during a Type 1 to Type 0 conversion. |

Secondary Arbitration Control Register-SACR

The Secondary Arbitration Control Register (SACR) is used to set the arbitration priority of each device which uses the secondary PCI bus. Writing a value will set the arbitration while reading the register will return the programmed value. Each device is given a 2 bit priority. The priority is shown in Table 4e.

TABLE 4e

Programmed Priority Control

| 2-Bit Programmed Value | Priority Level |
|---|---|
| $00_2$ | High Priority |
| $01_2$ | Medium Priority |
| $10_2$ | Low Priority |
| $11_2$ | Disabled |

The SACR register also contains the Secondary Arbiter Enable bit for the secondary bus arbitration unit. When this bit is clear, the secondary bus arbiter is disabled and the bridge will drive S_REQ# on S_GNT0# and sample S_GNT# on S_REQ0#. The default state is for the internal secondary arbitration unit to be enabled (Secondary Arbiter Enable bit is set)

PCI Interrupt Routing Select Register-PIRSR

The PCI Interrupt Routing Select Register is described below with reference to the PCI and Peripheral Interrupt Controller (PPIC).

Secondary I/O Base Register-SIOBR

The bits in the Secondary I/O Base Register are used when the secondary PCI interface is enabled for positive decoding. The Secondary I/O Base Register defines the bottom address (inclusive) of a positively decoded address range that is used to determine when to forward I/O transactions from the secondary interface to the primary interface of the bridge. It must be programmed with a valid value before the Secondary Decode Enable Register (SDER) is set. The bridge only supports 16-bit addressing which is indicated by a value of 0H in the 4 least significant bits of the register. The upper 4 bits are programmed with S_AD[15:12] for the bottom of the address range. S_AD[11:0] of the base address is always 000H forcing the secondary I/O address range to be 4 Kbyte aligned.

For the purposes of address decoding, the bridge assumes that S_AD[31:16], the upper 16 address bits of the I/O address, are zero. The bridge must still perform the address decode on the full 32 bits of address per PCI Local Bus Specification and check that the upper 16 bits are equal to 0000H.

The positive secondary I/O address range (defined by the SIOBR in conjunction with the SIOLR) is not affected by the state of the ISA Enable bit in the Bridge Control Register (BCR).

TABLE 4f

Secondary I/O Base Register - SIOBR

| Bit | Default | Read/Write | Description |
|---|---|---|---|
| 07:04 | 0H | Read/Write | Secondary I/O Base Address - This field is programmed with S_AD[15:12] of the bottom of the positively decoded secondary I/O address range to be passed from the secondary to the primary side of the bridge. |
| 03:00 | 0H | Read Only | I/O Addressing Capability - The value of 0H signifies that the bridge only supports 16 bit I/O addressing. |

Secondary I/O Limit Register-SIOLR

The bits in the Secondary I/O Limit Register are used when the secondary PCI interface is enabled for positive decoding. The Secondary I/O Limit Register defines the upper address (inclusive) of a positively decoded secondary address range that is used to determine when to forward I/O transactions from the secondary to primary interface of the bridge. It must be programmed with a valid value greater than or equal to the SIOBR before the I/O Space Enable bit in the Bridge Command Register and the Secondary Positive I/O Decode Enable bit in the Secondary Decode Enable Register (SDER) are set. If the value in the SIOBR is greater than the value in the SIOLR, I/O cycles forwarded from the secondary to primary interface (positively decoded) are undefined. The bridge only supports 16 bit addressing which is indicated by a value of 0H in the 4 least significant bits of the register. The upper 4 bits are programmed with S_AD[15:12] for the top of the address range. S_AD[11:0] of the base address is always FFFH forcing a 4 Kbyte I/O range granularity.

For the purposes of address decoding, the bridge assumes that S_AD[31:16], the upper 16 address bits of the I/O address, are zero. The bridge must still perform the address decode on the full 32 bits of address per PCI Local Bus Specification and check that the upper 16 bits are equal to 0000H.

The Secondary I/O address range (defined by the SIOBR in conjunction with the SIOLR) is not modified by the ISA Enable bit of the Bridge Control Register.

TABLE 4g

Secondary I/O Limit Register - SIOLR

| Bit | Default | Read/Write | Description |
|---|---|---|---|
| 07:04 | 0H | Read/Write | Secondary I/O Limit Address - This field is programmed with S_AD[15:12] of the top of the positively decoded I/O address range to be passed from the secondary to primary interface. |
| 03:00 | 0H | Read Only | Secondary I/O Addressing Capability - The value of 0H signifies that the bridge only supports 16-bit I/O addressing. |

Secondary Memory Base Register-SMBR

The bits in the Secondary Memory Base Register are used when the secondary interface of the bridge unit is enabled for positive address decoding. They are also used to define a private address space on the secondary PCI bus if the Private Address Space Enable bit in the SDER. The Secondary Memory Base Register defines the bottom address (inclusive) of a memory-mapped address range that is used to determine when to forward transactions from the secondary to primary interface. The Secondary Memory Base Register must be programmed with a valid value before the Secondary Positive Memory Decode Enable bit in the SDER is set. The upper 12 bits correspond to S_AD[31:20] of 32 bit addresses. For the purposes of address decoding, the bridge assumes that S_AD[19:0], the lower 20 address bits of the memory base address, are zero. This means that the bottom of the defined address range will be aligned on a 1 Mbyte boundary.

TABLE 4h

Secondary Memory Base Register - SMBR

| Bit | Default | Read/Write | Description |
|---|---|---|---|
| 15:04 | 000H | Read/Write | Secondary Memory Base Address - This field is programmed with S_AD[31:20] of the bottom of the positively decoded secondary memory address range to be passed from the secondary to primary interface. |
| 03:00 | 0H | Read Only | Reserved |

Secondary Memory Limit Register-SMLR

The bits in the Secondary Memory Limit Register are used when the secondary interface of the bridge unit is enabled for positive address decoding. The Secondary Memory Limit Register defines the upper address (inclusive) of a memory-mapped address range that is used to determine when to forward transactions from the secondary to primary interface. The Secondary Memory Limit Register must be programmed to a value greater than or equal to the SMBR before the Memory Space Enable bit and the Secondary Positive Memory Decode Enable bit are set. If the value in the SMLR is not greater than or equal to the value of the SMBR once the Memory Space Enable bit or Secondary Memory Enable bit are set, positively decoded memory transactions from the secondary to the primary will be indeterminate. The upper 12 bits correspond to S_AD [31:20] of 32 bit addresses. For the purposes of address decoding, the bridge assumes that S_AD[19:0], the lower 20 address bits of the secondary memory base address, are FFFFFH. This forces a 1 Mbyte granularity on the memory address range.

TABLE 4i

Secondary Memory Limit Register - SMLR

| Bit | Default | Read/Write | Description |
| --- | --- | --- | --- |
| 15:04 | 000H | Read/Write | Secondary Memory Limit Address - This field is programmed with S_AD[31:20] of the top of the secondary memory address range to be passed from the secondary to primary side. |
| 03:00 | 0H | Read Only | Reserved |

Secondary Decode Enable Register-SDER

The Secondary Decode Enable Register is used to control the address decode functions on the secondary PCI interface of the bridge unit. The Secondary Positive I/O Decode Enable bit, when set, causes the bridge to decode and claim transactions within the address range defined by the SIOBR/SIOLR address pair and forward them through the bridge unit. The Secondary Positive Memory Decode Enable bit has the same function as the Secondary Positive I/O Decode Enable bit but works with the SMBR/SMLR address range. Setting either of these bits disables all inverse decoding on the secondary interface.

The Secondary Subtractive Decoding Enable bit allows for subtractive bridge decoding on the secondary interface to support standard bus expansion bridges on the primary interface. This bit only enables subtractive decoding on the secondary interface if either the Secondary Positive I/O Decode Enable bit or the Secondary Positive Memory Decode Enable bit is set.

The Private Memory Space Enable bit allows a private memory space to be created on the secondary PCI bus. This bit is used in conjunction with the SMBR/SMLR registers. If this bit is set, transactions with addresses within the SMBR/SMLR address range are ignored by the bridge.

TABLE 4j

Secondary Decode Enable Register - SDER

| Bit | Default | Read/Write | Description |
| --- | --- | --- | --- |
| 15:04 | 000000000000$_2$ | Read Only | Reserved |
| 03 | 0$_2$ | Read/Write | Private Memory Space Enable - when set, this bit disables Bridge forwarding of addresses in the SMBR/SMLR address range. |

TABLE 4j-continued

Secondary Decode Enable Register - SDER

| Bit | Default | Read/Write | Description |
| --- | --- | --- | --- |
| | | | This creates a private memory space on the secondary PCI bus that allows peer to peer transactions. |
| 02 | 0$_2$ | Read/Write | Secondary Subtractive Decoding Enable - when set, this bit enables the secondary interface to use subtractive decoding (5 clocks after S_FRAME# asserted) to claim transactions on the secondary bus. Any transaction not claimed by the 4th clock after S_FRAME# will be claimed by the secondary interface on the 5th clock and forwarded to the primary PCI interface. |
| 01 | 0$_2$ | Read/Write | Secondary Positive Memory Decode Enable - when set, this bit enables the secondary interface of the bridge unit to positively decode memory addresses on the secondary bus. Addresses within the SMBR/SMLR address range will be forwarded through the bridge. Inverse decoding will be disabled. |
| 00 | 0$_2$ | Read/Write | Secondary Positive I/O Decode Enable - when set, this bit enables the secondary interface of the bridge unit to positively decode I/O addresses on the secondary bus. Addresses within the SIOBR/SIOLR address pair will be forwarded through the bridge. Inverse decoding will be disabled. |

Address Transaltion Unit

The following is a description of the mechanism which interfaces between the primary and secondary PCI busses and the local bus. The operation modes, setup, and implementation of the interface are described.

Overview

The P2P processor provides an interface between the PCI bus and the local bus. This interface consists of two address translation units (ATU) 43a/43b and a messaging unit 45. The ATUs support both inbound and outbound address translation. The first address translation unit is called the primary ATU 43a. It provides direct access between the primary PCI bus and the local bus. The second address translation unit, called the secondary ATU 43b, provides direct access between the secondary PCI bus and the local bus. The use of two ATUs in this manner provides significant advantages over prior art techniques.

During inbound transactions, the ATU converts PCI addresses (initiated by a PCI bus master) to local processor addresses and initiates the data transfer on the local bus. During outbound transactions, the ATU converts local processor addresses to PCI addresses and initiates the data transfer on the respective PCI bus.

Figure 6:
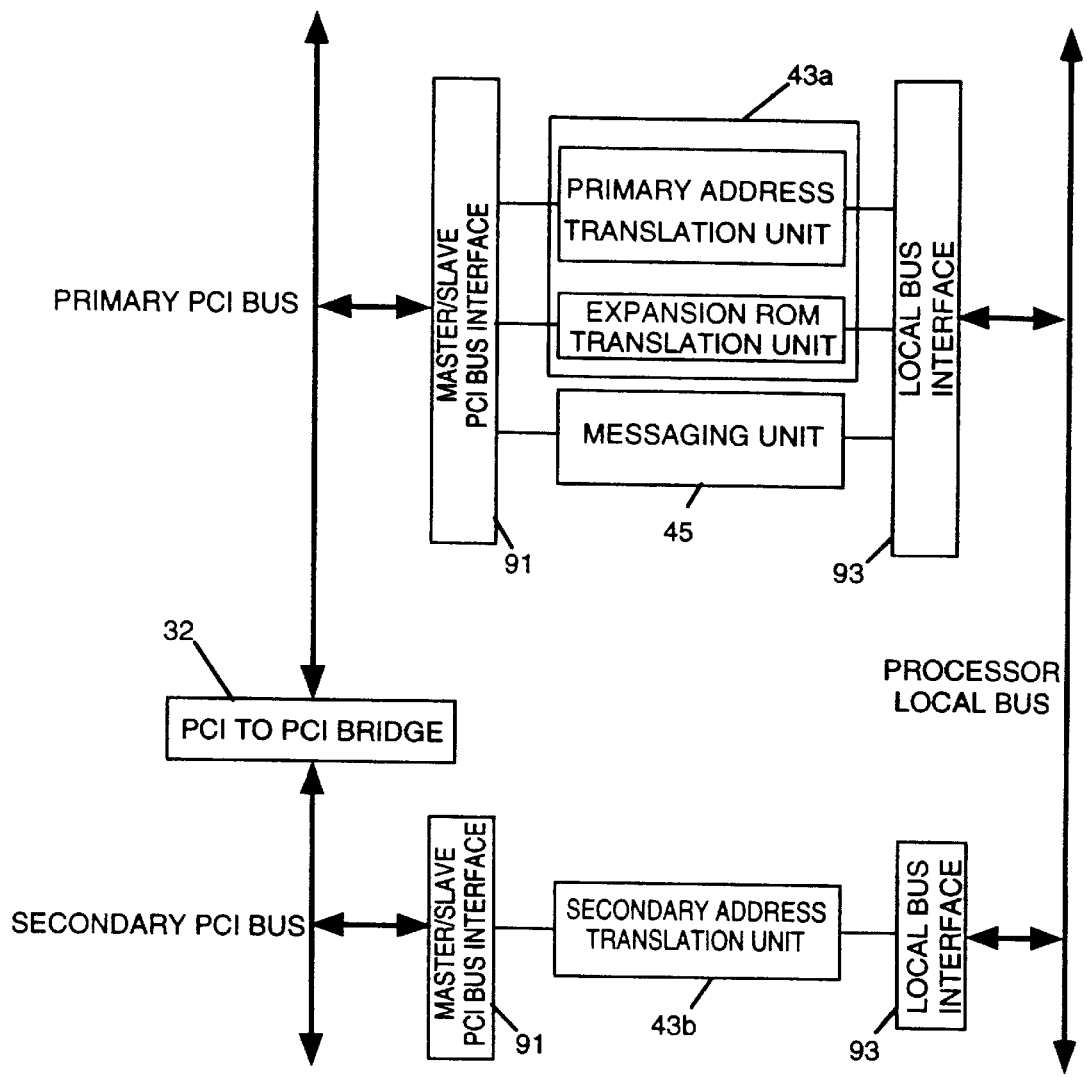
FIG. 6 is a block diagram of the primary and secondary ATUs.

Both address translation units and the messaging unit appear as a single PCI device on the primary PCI bus. These units collectively are the second PCI function in the multi-function P2P processor. The block diagram for the ATUs and the messaging unit is shown in FIG. 6.

The functionality of the ATUs and the messaging unit are described below. All of the units shown have a memory-mapped register interface that is visible from either the PCI interface 91, the local bus interface 93, or both.

ATU Data Flow

The primary ATU and the secondary ATU support transactions from both directions through the P2P processor. The primary ATU allows PCI masters on the primary PCI bus to initiate transactions to the local bus and allows the local processor to initiate transactions to the primary PCI bus. The secondary ATU performs the same function, but on the secondary PCI bus and for secondary PCI bus masters. Transactions initiated on a PCI bus and targeted at the local bus are referred to as inbound transactions and transactions initiated on the local bus and targeted at a PCI bus are referred to as outbound transactions.

ATU Address Translation

The ATUs implement an address windowing scheme to determine which addresses to claim and translate to the appropriate bus.

The primary ATU contains a data path between the primary PCI bus and the local bus. Connecting the primary ATU in this manner enables data transfers to occur without requiring any resources on the secondary PCI bus. The secondary ATU contains a data path between the secondary PCI bus and the local bus. The secondary ATU allows secondary PCI bus masters to directly access the local bus and memory. These transactions are initiated by a secondary bus master and do not require any bandwidth on the primary PCI bus.

The ATU units allow for recognition and generation of multiple PCI cycle types. Table 5 shows the PCI commands supported by both inbound and outbound ATUs. The type of operation seen by the inbound ATUs is determined by the PCI master (on either primary or secondary bus) who initiates the transaction. Claiming an inbound transaction is dependent on the address being within the programmed inbound translation window. The type of transaction used by the outbound ATUs is determined by the local address and the fixed outbound windowing scheme.

TABLE 5

ATU Command Support

| PCI Command Type | Claimed on Inbound Transactions | Generated by Outbound Transactions |
| --- | --- | --- |
| I/O Read | No | Yes |
| I/O Write | No | Yes |
| Memory Read | Yes | Yes |
| Memory Write | Yes | Yes |
| Memory Write and Invalidate | Yes | No |
| Memory Read Line | Yes | No |
| Memory Read Multiple | Yes | No |
| Configuration Read | Yes | Yes |
| Configuration Write | Yes | Yes |
| Dual Address Cycle | No | Yes |

Both ATUs support the 64-bit addressing extension specified by the PCI local bus specification. This 64-bit addressing extension is for outbound data transactions only (i.e. data transfers initiated by the local processor).

Inbound Address Translation

The ATUs provide the mechanism which allow PCI bus masters to directly access the local bus. These PCI bus masters can read or write P2P processor memory-mapped registers or local memory space. The transactions where PCI bus masters are accessing the local bus are called inbound transactions.

Inbound translation involves two steps:

1. Address Detection.
    Determine if the 32-bit PCI address is within the address window defined for the inbound ATU (primary or secondary).
    Claim the PCI transaction with fast DEVSEL# timing.
2. Address Translation.
    Translate the 32-bit PCI address to a 32-bit local address.

The primary ATU uses the following registers in inbound address translation:

Primary Inbound ATU Base Address Register

Primary Inbound ATU Limit Register

Primary Inbound ATU Translate Value Register

The secondary ATU uses the following registers in inbound address translation:

Secondary Inbound ATU Base Address Register

Secondary Inbound ATU Limit Register

Secondary Inbound ATU Translate Value Register

By convention, primary inbound ATU addresses are primary PCI addresses and secondary inbound ATU addresses are secondary PCI addresses. In the event that an address is capable of being claimed by both the ATU and the bridge, the inbound ATU PCI interface will have priority.

Inbound address detection is determined from the 32-bit PCI address, the base address register and the limit register. The algorithm for detection is:

If(PCI Address & Limit Register==Base Register) then the PCI Address is claimed by the Inbound ATU The incoming 32-bit PCI address is bitwise ANDed with the associated inbound limit register. If the result matches the base register then the inbound PCI address is detected as being within the inbound translation window and is claimed by the ATU.

Once the transaction has been claimed, then the address within the IAQ must be translated from a 32-bit PCI address to a 32-bit local processor address. The algorithm for this translation is:

Local Address=(PCI Address & ~Limit Register)|Value Register

The incoming 32-bit PCI address is first bitwise ANDed with the bitwise inverse of the limit register. This result is then bitwise ORed with the value register and the result is the local address. This translation mechanism is used for all inbound memory read and write commands excluding inbound configuration read and writes. Address aliasing of multiple PCI addresses to the same physical local address can be prevented by programming the inbound value register on boundaries matching the associated limit register, but this only enforced through application programming.

Outbound Address Translation

In addition to providing the mechanism for inbound translation, the ATUs provide the hardware necessary to translate local processor initiated cycles to the PCI bus. This is known as outbound address translation. Outbound transactions are processor reads or writes targeted at one of the PCI buses (primary or secondary). The ATU local bus slave interface will claim local processor bus cycle and complete the cycle on the PCI bus on behalf the local processor. The primary and secondary ATUs support two different outbound translation modes:

Address Translation Windows

Direct Addressing Window

Expansion ROM Translation Unit

The primary inbound ATU supports one address range (defined by a base/limit register pair) used for containing the Expansion ROM. The PCI Local Bus Specification provides details on Expansion ROM formats and usage.

The initialization code from an Expansion ROM will be executed once by the host processor during the powerup sequence to initialize the associated device. The code can be discarded after it is executed.

The inbound primary ATU will support an inbound Expansion ROM window which works like the inbound translation window. A read from the expansion ROM windows will be forwarded to the local bus and to the Memory Controller. The address translation algorithm is the same as in inbound translation. Two different ROM widths are supported: 8-bit and 32-bit. The Expansion ROM Width bit of the ATUCR should be programmed by the software to reflect the physical configuration of the Expansion ROM. This bit determines how the ATU accesses the Expansion ROM (see below).

The inbound ATU performs the following functions:

The primary ATU detects a "hit" to the expansion ROM window.

The primary ATU translates the address (in the IAQ) using the ERTVR and the ERLR.

To accommodate the 8-bit device, the inbound ATU performs four separate reads on the local bus to return one 32-bit value to the primary PCI bus. Each read will consist of a 8-bit cycle with byte enables BE1:0# used as the byte address. Each read returns one data byte to the packing hardware (on the AD7:0 byte lane) contained within the primary ATU.

The P2P memory controller performs one read in response to each local bus request from the primary ATU. Since it is accessing an 8-bit device, the memory controller will perform an 8-bit read with an 8-bit cycle. The memory controller will return the data on the appropriate byte lane (based on byte enable).

The packing hardware within the ATU will return the entire 32-bit word (from delayed read transaction) to the primary PCI bus when its four cycles are complete. The packing hardware is responsible for making sure the bytes are in the right lane.

If the primary PCI bus requests less than four bytes, the primary ATU adjusts the number of byte reads to accommodate. Any accesses that are not local bus aligned result in reads up to the aligned boundary.

Register Definitions

Every PCI device implements its own separate configuration address space and configuration registers. The PCI Local Bus Specification Rev. 2.1 requires that the configuration space be 256 bytes long with the first 64 bytes adhering to a predefined header format.

Both the primary and secondary ATUs are programmed via a Type 0 configuration command on the primary interface. Secondary ATU programming is possible through secondary inbound configuration cycles. The ATU and messaging unit configuration space is function number one of the P2P processor multi-function PCI device.

Beyond the required 64 byte header format, the ATU and messaging unit configuration space implements extended register space in support of the units functionality. The PCI Local Bus Specification contains details on accessing and programming configuration register space.

The configuration space consists of 8, 16, 24, and 32-bit registers arranged in a predefined format. Table 6 summarized all of the registers found within PCI function one configuration address space.

Each register is described in functionality, access type (read/write, read/clear, read only) and reset default condition. The PCI register number for each register is given in Table 6. As stated, a type 0 configuration command on the primary or secondary bus with an active IDSEL or a memory-mapped local processor access is required to read or write these registers.

TABLE 6

Address Translation Unit PCI Configuration Register Summary

| Register Name | Register Size in Bits | PCI Configuration Cycle Register Number | Local Processor Cycle Address Offset |
|---|---|---|---|
| ATU Vendor ID | 16 | 0 | 00H |
| ATU Device ID | 16 | 0 | 02H |
| Primary ATU Command Register | 16 | 1 | 04H |
| Primary ATU Status Register | 16 | 1 | 06H |
| ATU Revision ID | 8 | 2 | 08H |
| ATU Class Code | 24 | 2 | 09H |
| ATU Cacheline Size | 8 | 3 | 0CH |
| ATU Latency Timer | 8 | 3 | 0DH |
| ATU Header Type | 8 | 3 | 0EH |
| BIST Register | 8 | 3 | 0FH |
| Primary Inbound ATU Base Address | 32 | 4 | 10H |
| Reserved | 32 | 5 | 14H |
| Reserved | 32 | 6 | 18H |
| Reserved | 32 | 7 | 1CH |
| Reserved | 32 | 8 | 20H |
| Reserved | 32 | 9 | 24H |
| Reserved | 32 | 10 | 28H |
| Reserved | 32 | 11 | 2CH |
| Expansion ROM Base Address | 32 | 12 | 30H |
| Reserved | 32 | 13 | 34H |
| Reserved | 32 | 14 | 38H |
| ATU Interrupt Line | 8 | 15 | 3CH |
| ATU Interrupt Pin | 8 | 15 | 3DH |
| ATU Minimum Grant | 8 | 15 | 3EH |
| ATU Maximum Latency | 8 | 15 | 3FH |
| Primary Inbound ATU Limit Register | 32 | 16 | 40H |
| Primary Inbound ATU Translate Value Register | 32 | 17 | 44H |
| Secondary Inbound ATU Base Address Register | 32 | 18 | 48H |
| Secondary Inbound ATU Limit Register | 32 | 19 | 4CH |
| Secondary Inbound ATU Translate Value Register | 32 | 20 | 50H |
| Primary Outbound Memory Window Value Register | 32 | 21 | 54H |
| Reserved | 32 | 22 | 58H |
| Primary Outbound I/O Window Register | 32 | 23 | 5CH |
| Primary Outbound DAC Window Value Register | 32 | 24 | 60H |
| Primary Outbound Upper 64-Bit DAC Register | 32 | 25 | 64H |
| Secondary Outbound Memory Window Value Register | 32 | 26 | 68H |
| Secondary Outbound I/O Window Register | 32 | 27 | 6CH |
| Reserved | 32 | 28 | 70H |
| Expansion ROM Limit Register | 32 | 29 | 74H |
| Expansion ROM Translate Value Register | 32 | 30 | 78H |
| Reserved | 32 | 31 | 7CH |
| Reserved | 32 | 32 | 80H |
| Reserved | 32 | 33 | 84H |
| ATU Configuration Register | 32 | 34 | 88H |
| Reserved | 32 | 35 | 8CH |
| Primary ATU Interrupt Status Register | 32 | 36 | 90H |
| Secondary ATU Interrupt Status Register | 32 | 37 | 94H |
| Secondary ATU Command Register | 32 | 38 | 98H |
| Secondary Outbound DAC Window Value Register | 32 | 39 | 9CH |
| Secondary Outbound Upper 64-Bit DAC Register | 32 | 40 | A0H |
| Primary Outbound Configuration Cycle Address Register | 32 | 41 | A4H |

TABLE 6-continued

Address Translation Unit PCI Configuration Register Summary

| Register Name | Register Size in Bits | PCI Configuration Cycle Register Number | Local Processor Cycle Address Offset |
|---|---|---|---|
| Secondary Outbound Configuration Cycle Address Register | 32 | 42 | A8H |
| Primary Outbound Configuration Cycle Data Register | 32 | Not Available in PCI Configuration Space | ACH |
| Secondary Outbound Configuration Cycle Data Register | 32 | Not Available in PCI Configuration Space | B0H |
| Reserved | 32 | 45 | B4H |
| Reserved | 32 | 46 | B8H |
| Reserved | 32 | | BCH |
| Reserved | 32 | | C0H |

The bits in the ATU Vendor ID Register through the ATU Maximum Latency Register adhere to the definitions in the PCI Local Bus Specification, and, therefore, are not described herein.

Primary Inbound ATU Limit Register-PIALR

The primary inbound address translation occurs for data transfers occurring from the PCI bus (originated from the primary PCI bus) to the local bus. The address translation block converts the PCI addresses to local processor address. All data transfers are directly translated, thus, the bus master initiating the data transfers shall break unaligned transfers into multiple data transfers. The byte enables shall specify which data paths are valid The primary inbound translation base address is specified in the, "Primary Inbound ATU Base Address Register—PIABAR". When determining the block size requirements, the primary translation limit register provides the block size requirements for the primary base address register. The remaining registers used for performing address translation are discussed above with reference to "Inbound Address Translation".

The programmed value within the local processor value register must be naturally aligned with the programmed value found in the base address register. The limit register will be used as a mask thus the lower address bits programmed into the local processor value register will be invalid. The PCI local bus specification contains additional information on programming base address registers TABLE 7a Primary Inbound ATU Limit Register - PILR

| Bit | Default | Read/Write | Description |
|---|---|---|---|
| 31:04 | 0000000H | Read Only | Primary Inbound Translation Limit - This is the read back value that determines the block size of memory required for the primary ATU translation unit. |
| 03:00 | $0000_2$ | Read Only | Reserved |

Primary Inbound ATU Translate Value Register-PIATVR

The Primary Inbound ATU Translate Value Register (PIATVR) contains the local address used to convert primary PCI bus addresses. The converted address will be driven on the local bus as a result of the primary inbound ATU address translation.

TABLE 7b

Primary Inbound ATU Translate Value Register - PIATVR

| Bit | Default | Read/Write | Description |
|---|---|---|---|
| 31:02 | 0000.0800H | Read Only | Primary Inbound ATU Translation Value - This register contains value used to convert the primary PCI address to local addresses. The primary inbound address translation value must be word aligned on the local bus. The default address will allow the translation unit access to the internal P2P memory-mapped registers. |
| 01:00 | $00_2$ | Read Only | Reserved |

Secondary Inbound ATU Base Address Register-SIABAR

The Secondary Inbound ATU Base Address Register (SIABAR) defines the block of memory addresses where the secondary inbound translation window begins. The inbound ATU will decode and forward the bus request to the local bus with a translated address to map into the local memory. The SIABAR defines the base address and describes the size of the block of memory needed. The effects on the base address register are that when a value of FFFF.FFFFH is written to the SIABAR, the next read from the register will return data from the Primary Inbound ATU Limit Register (SIALR) and not the SIABAR.

The programmed value within the base address register must comply with the PCI programming requirements for address alignment. The PCI local bus specification contains additional information on programming base address registers TABLE 7c Secondary Inbound ATU Base Address Register - SIBADR

| Bit | Default | Read/Write | Description |
|---|---|---|---|
| 31:04 | XXXXXXXH | Read/Write | Secondary Translation Base Address - These bits define the actual location the Secondary Translation function is to respond to when addressed from the secondary PCI bus. The default block size is indeterminate. |
| 03 | $1_2$ | Read Only | Prefetchable Indicator - This bit defines the memory spaces as prefetchable. |
| 02:01 | $00_2$ | Read Only | Address Type - These bits define where the block of memory can be located. The base address must be located anywhere in the first 4 Gbyte of address space (lower 32-bits of address). |
| 00 | $0_2$ | Read Only | Memory Space Indicator - This bit field shows the register contents describes memory or I/O space base address. The ATU does not occupy I/O space, thus this bit must be zero. |

Secondary Inbound ATU Limit Register-SIALR

The secondary inbound address translation occurs for data transfers occurring from the secondary PCI bus to the local bus. The address translation block converts the PCI addresses to local processor address. All data transfers are directly translated, thus, the bus master initiating the data transfers breaks unaligned transfers into multiple data transfers. The byte enables specify which data paths are valid.

When determining the block size requirements, the secondary limit register provides the block size requirements for the secondary base address register. The remaining registers used for performing address translation are discussed above with reference to "Inbound Address Translation".

The programmed value within the local processor value register must be naturally aligned with the programmed value found in the base address register. The limit register will be used as a mask thus the lower address bits programmed into the local processor value register will be invalid.

TABLE 7d

Secondary Inbound ATU Limit Register - SIALR

| Bit | Default | Read/Write | Description |
|---|---|---|---|
| 31:04 | 0000000H | Read Only | Secondary Inbound ATU Limit - This is the read back value that determines the block size of memory required for the secondary ATU translation unit. |
| 03:00 | $0000_2$ | Read Only | Reserved |

Secondary Inbound ATU Translate Value Register-SIATVR

The Secondary Inbound ATU Translate Value Register (SIATVR) contains the local address used to convert the secondary PCI bus address to a local address. This address will be driven on the local bus as a result of the secondary inbound ATU address translation.

TABLE 7e

Secondary Inbound Translate ATU Value Register - SIATVR

| Bit | Default | Read/Write | Description |
|---|---|---|---|
| 31:02 | 0000.0800H | Read Only | Secondary Inbound ATU Translate Value - This value is used to convert the secondary PCI address to a local address. The secondary inbound address translation value must be word aligned on the local bus. The default address will allow the translation unit access to the internal P2P registers. |
| 01:00 | $00_2$ | Read Only | Reserved |

Primary Outbound Memory Window Value Register-POMW0VR

The Primary Outbound Memory Window Value Register (POMWVR) contains the primary PCI address used to convert local addresses for outbound transactions. This address will be driven on the primary PCI bus as a result of the primary outbound ATU address translation.

Primary memory window 0 is from local processor address 8000.000H to 807F.FFFFH with the fixed length of 8 Mbytes.

TABLE 7f

Primary Outbound Memory Window Value Register - POMW0VR

| Bit | Default | Read/Write | Description |
|---|---|---|---|
| 31:02 | 00000000H | Read/Write | Primary Outbound MW Value - This value is used to convert local addresses to PCI addresses. |
| 01:00 | $00_2$ | Read only | Burst Order - This bit field shows the address sequence during a memory burst. All targets must check |

TABLE 7f-continued

Primary Outbound Memory Window Value Register - POMW0VR

| Bit | Default | Read/Write | Description |
|---|---|---|---|
| | | | the state of address bits zero and one to determine the memory addressing sequence that the initiator intends to use during the burst transfer. ($00_2$) Linear, or sequential, addressing sequence during the burst. |

Primary Outbound I/O Window Value Register-POIOWVR

The Primary Outbound I/O Window Value Register (POIOWVR) contains the primary PCI I/O read or write which the ATU will convert the local bus access to.

The primary I/O window is from local address 8200.000H to 8200.FFFFH with the fixed length of 64 Kbytes.

TABLE 7g

Primary Outbound I/O Window Value Register - POIOWVR

| Bit | Default | Read/Write | Description |
|---|---|---|---|
| 31:02 | 0000.0000H | Read/Write | Primary Outbound I/O Window Value - This value is used to convert local addresses to PCI addresses. |
| 01:00 | $00_2$ | Read Only | Burst Order - This bit field shows the address sequence during a memory burst. All targets must check the state of address bits zero and one to determine the memory addressing sequence that the initiator intends to use during the burst transfer. ($00_2$) Linear, or sequential, addressing sequence during the burst. |

Primary Outbound DAC Window Value Register-PODWVR

The Primary Outbound DAC Window Value Register (PODWVR) contains the primary PCI DAC address used to convert an local address. This address will be driven on the primary PCI bus as a result of the primary outbound ATU address translation. This register is used in conjunction with the Primary Outbound Upper 64-Bit DAC Register.

The primary DAC window is from local address 8080.000H to 80FF.FFFFH with the fixed length of 8 Mbytes.

TABLE 7h

Primary Outbound DAC Window Value Register - PODWVR

| Bit | Default | Read/Write | Description |
|---|---|---|---|
| 31:02 | 00000000H | Read/Write | Primary Outbound DAC Window Value - This value the primary ATU is used to convert local addresses to PCI addresses. |
| 01:00 | $00_2$ | Read Only | Burst Order - This bit field shows the address sequence during a memory burst. All targets must check the state of address bits zero and one to determine the memory addressing sequence that the initiator intends to use during the burst transfer. ($00_2$) Linear, or sequential, addressing sequence during the burst. |

Primary Outbound Upper 64-bit DAC Register-POUDR

The Primary Outbound Upper 64-bit DAC Register (POUDR) defines the upper 32-bits of address used during a dual address cycle. This enables the primary outbound ATU to directly address anywhere within the 64-bit host address space.

TABLE 7i

Primary Outbound Upper 64-bit DAC Register - POUDR

| Bit | Default | Read/Write | Description |
| --- | --- | --- | --- |
| 31:00 | 0000.0000H | Read/Write | These bits define the upper 32-bits of address driven during the dual address cycle (DAC). |

Secondary Outbound Memory Window Value Register-SOMWVR

The Secondary Outbound Memory Window Value Register (SOMWVR) contains the secondary PCI address used to convert local addresses for outbound transactions. This address will be driven on the secondary PCI bus as a result of the secondary outbound ATU address translation.

The secondary memory window is from local address 8100.000H to 817F.FFFFH with the fixed length of 8 Mbytes.

TABLE 7j

Secondary Output Memory Window Value Register - SOMWVR

| Bit | Default | Read/Write | Description |
| --- | --- | --- | --- |
| 31:02 | 0000.0000H | Read/Write | Secondary Outbound Memory Window Value - This value is used to convert local addresses to PCI addresses. |
| 01:00 | $00_2$ | Read Only | Burst Order - This bit field shows the address sequence during a memory burst. All targets must check the state of address bits zero and one to determine the memory addressing sequence that the initiator intends to use during the burst transfer. ($00_2$) Linear, or sequential, addrressing sequence during the burst. |

Secondary Outbound I/O Window Value Register-SOIOWVR

The Secondary Outbound I/O Window Value Register (SOIOWVR) contains the secondary PCI I/O address used to convert local addresses. This address will be driven on the secondary PCI bus as a result of the secondary outbound ATU address translation.

If the Secondary PCI Boot Mode bit in the ATUCR is set, then this register is used to translate local addresses that access the region of FE00.0000H to FFFF.FFFFH. If this bit is clear, this register is used to translate local addresses that access the secondary I/O window from 8201.0000H to 8201.FFFFH.

The secondary I/O window is from local address 8201.0000H to 8201.FFFFH with the fixed length of 64 Kbytes.

TABLE 7k

Primary Outbound I/O Window Value Register - POIOWVR

| Bit | Default | Read/Write | Description |
| --- | --- | --- | --- |
| 31:02 | 0000.0000H | Read/Write | Secondary Outbound I/O Window Value - This value is used to convert local addresses to PCI addresses. |
| 01:00 | $00_2$ | Read Only | Burst Order - This bit field shows the address sequence during a memory burst. All targets must check the state of address bits zero and one to determine the memory addressing sequence that the initiator intends to use during the burst transfer. ($00_2$) Linear, or sequential, addressing sequence during the burst. |

Expansion ROM Limit Register-ERLR

The Expansion ROM Limit Register (ERLR) defines the block size of addresses the primary ATU will define as Expansion ROM address space. The block size is programmed by writing a value into the ERLR from the local processor. The possible programmed values range from 2 Kbytes (FFFF.F800H) to 16 Mbytes (FF00.0000H).

TABLE 7l

Expansion ROM Limit Register - ERLR

| Bit | Default | Read/Write | Description |
| --- | --- | --- | --- |
| 31:11 | 000000H | Read Only | Expansion ROM Limit - Block size of memory required for the Expansion ROM translation unit. The default value is 0 meaning no expansion ROM address space. |
| 10:00 | 000H | Read Only | Reserved |

Expansion ROM Translate Value Register-ERTVR

The Expansion ROM Translate Value Register contains the local address which the primary ATU will convert the primary PCI bus access. This address will be driven on the local bus as a result of the primary Expansion ROM address translation.

TABLE 7m

Expansion ROM Translate Value Register - ERTVR

| Bit | Default | Read/Write | Description |
| --- | --- | --- | --- |
| 31:02 | 00000000H | Read Only | Expansion ROM Local Processor Translation Value - This value is used to convert PCI addresses to local addresses for Expansion ROM accesses. The Expansion ROM address translation value must be word aligned on the local bus. |
| 01:00 | $00_2$ | Read Only | Reserved |

ATU Configuration Register-ATUCR

The ATU Configuration Register contains the control bits to enable and disable the interrupts generated by the doorbell registers. This register also controls the outbound address translation from both the primary and secondary outbound translation units and contains a bit for Expansion ROM width.

TABLE 7n

ATU Configuration Register - ATUCR

| Bit | Default | Read/Write | Description |
|---|---|---|---|
| 31:12 | 00000H | Read Only | Reserved |
| 11 | $0_2$ | Read/Write | Secondary PCI Boot Mode - If set, the secondary ATU will claim all local bus accesses with addresses in the range: FE000000H to FFFFFFFFH. This allows the local processor to boot from the secondary PCI bus. The translation algorithm will use the Secondary Outbound I/O Window Value Register in this mode. |
| 10 | $0_2$ | Read Only | Reserved |
| 09 | $0_2$ | Read Only | Reserved |
| 08 | $0_2$ | Read/Write | Direct Addressing Enable - Setting this bit will enable direct addressing through the ATUs. Local bus cycles with an address between 0000.1000H and 07FFF.FFFFH will automatically be forwarded to the PCI bus with no address translation. The ATU which claims the direct addressing transaction is dependent on the state of the Secondary Direct Addressing Select bit. |
| 07 | $0_2$ | Read/Write | Secondary Direct Addressing Select - Setting this bit will result in direct addressing outbound transactions to be forwarded through the secondary ATU to the secondary PCI bus. When clear, direct addressing uses the primary ATU and the primary PCI bus. The Direct Addressing Enable bit must be set to enable direct addressing. |
| 06 | $0_2$ | Read/Write | Expansion ROM Width - When clear, this bit signifies that an 8-bit Expansion ROM is being used. When set, this bit signifies that 32-bit Expansion ROM is in use. This bit is used in conjunction with the address decode enable (bit 0) of the ERBAR. |
| 05 | $0_2$ | Read/Write | Secondary ATU PCI Error Interrupt Enable - This bit acts as a mask for bits 4:0 of the Secondary ATU Interrupt Status Register. Setting this bit will enable an interrupt to the local processor when any of these bits is set in the SATUISR. Clearing this bit will disable the interrupt. |
| 04 | $0_2$ | Read/Write | Primary ATU PCI Error Interrupt Enable - This bit acts as a mask for bits 4:0 of the Primary ATU Interrupt Status Register. Setting this bit will enable an interrupt to the local processor when any of these bits is set in the PATUISR. Clearing this bit will disable the interrupt. |
| 03 | $0_2$ | Read/Write | ATU BIST Interrupt Enable - Setting this bit will enable an interrupt to the local processor when the start BIST bit is set in the ATUBISTR register. This bit is also reflected as the BIST Capable bit 7 in the ATUBISTR register. |
| 02 | $0_2$ | Read/Write | Secondary Outbound ATU Enable - Setting this bit enables the secondary outbound address translation unit. Clearing disables the secondary outbound ATU. |
| 01 | $0_2$ | Read/Write | Primary Outbound ATU Enable - Setting this bit enables the primary outbound address translation unit. Clearing this bit disables the primary outbound ATU. |
| 00 | $0_2$ | Read/Write | Doorbell Interrupt Enable - If set, this bit enables the Messaging Unit to generate a local processor interrupt for every inbound doorbell write. If clear, no interrupt is generated. |

Primary ATU Interrupt Status Register-PATUISR

The Primary ATU Interrupt Status Register is used to notify the local processor of the source of a Primary ATU or Doorbell interrupt. In addition, this register is written to clear the source of the interrupt to the interrupt unit of the P2P processor. All bits in this register are Read Only from PCI and Read/Clear from the local bus.

Bits 4:0 are a direct reflection of bit 8 and bits 14:11 (respectively) of the Primary ATU Status Register (these bits are set at the same time by hardware but need to be cleared independently). Bits 6:5 are set by an error associated with the Memory Controller. Bit 8 is for software BIST and bits 10:9 are for the messaging unit. The conditions that result in a Primary ATU interrupt or a doorbell interrupt are cleared by writing a 1 to the appropriate bits in this register.

TABLE 7o

Primary ATU Interrupt Status Register - PATUISR

| Bit | Default | Read/Write | Description |
|---|---|---|---|
| 31:11 | 000000H | Read Only | Reserved |
| 10 | $0_2$ | Read Only | Reserved |
| 09 | $0_2$ | Read Only | Reserved |
| 08 | $0_2$ | Read/Clear | ATU BIST Interrupt - If this bit is set, the host processor has set the start BIST, bit 6 of the ATUBISTR register, and the ATU BIST interrupt enable, bit 12 of the ATUCR register, is enabled. The local processor can initiate the software BIST and store the result in bits [3:0] of the ATUBISTR register. |
| 07 | $0_2$ | Read Only | Reserved |
| 06 | $0_2$ | Read/Clear | Local Processor Memory Fault - This bit is set when the Memory Controller detects a Memory Fault and the Primary ATU was the master for the transaction. |
| 05 | $0_2$ | Read/Clear | Local Processor Bus Fault - This bit is set when the Memory Controller detects a Bus Fault and the Primary ATU was the master for the transaction. |
| 04 | $0_2$ | Read/Clear | P_SERR# Asserted - This bit is set if P_SERR# is asserted on the PCI bus. |
| 03 | $0_2$ | Read/Clear | PCI Master Abort - This bit is set whenever a transaction initiated by the ATU master interface ends in a Master-abort. |
| 02 | $0_2$ | Read/Clear | PCI Target Abort (master) - This bit is set whenever a transaction initiated by the ATU master interface ends in a Master-abort. |
| 01 | $0_2$ | Read/Clear | PCI Target Abort (target) - This bit is set whenever the ATU interface, acting as a target, terminates the transaction on the PCI bus with a target abort. |
| 00 | $0_2$ | Read/Clear | PCI Master Parity Error - The ATU interface sets s this bit when three conditions are met: |

TABLE 7o-continued

Primary ATU Interrupt Status Register - PATUISR

| Bit | Default | Read/Write | Description |
|---|---|---|---|
| | | | 1) the bus agent asserted P_PERR# itself or observed P_PERR# asserted
2) the agent setting the bit acted as the bus master for the operation in which the error occurred
3) the parity error response bit (command register) is set
This bit is cleared by the host processor performing a read/clear operation on bit 8 of the PATUSR. |

Secondary ATU Interrupt Status Register-SATUISR

The Secondary ATU Interrupt Status Register is used to notify the local processor of the source of a Secondary ATU interrupt. In addition, this register is written to clear the source of the interrupt to the interrupt unit of the P2P processor. All bits in this register are Read Only from PCI and Read/Clear from the local bus.

The conditions that result in a Secondary ATU interrupt are cleared by writing a 1 to the appropriate bit in this register.

TABLE 7p

Secondary ATU Interrupt Status Register - SATUISR

| Bit | Default | Read/Write | Description |
|---|---|---|---|
| 31:07 | 0000000H | Read Only: | Reserved |
| 06 | $0_2$ | Read/Clear | Local Processor Memory Fault - This bit is set when the Memory Controller detects a Memory Fault and the Secondary ATU, was the master for the transaction. |
| 05 | $0_2$ | Read/Clear | Local Processor Bus Fault - This bit is set when the Memory Controller detects a Bus Fault and the Secondary ATU was the master for the transaction. |
| 04 | $0_2$ | Read/Clear | P_SERR# Asserted - This bit is set if P_SERR# is asserted on the PCI bus. |
| 03 | $0_2$ | Read/Clear | PCI Master Abort - This bit is set whenever a transaction initiated by the ATU master interface ends in a Master-abort. |
| 02 | $0_2$ | Read/Clear | PCI Target Abort (master) - This bit is set whenever a transaction initiated by the ATU master interface ends in a Master-abort. |
| 01 | $0_2$ | Read/Clear | PCI Target Abort (target) - This bit is set whenever the ATU interface, acting as a target, terminates the transaction on the PCI bus with a target abort. |
| 00 | $0_2$ | Read/Clear | PCI Master Parity Error - The secondary ATU interface sets s this bit when three conditions are met:
1) the bus agent asserted P_PERR# itself or observed P_PERR# asserted
2) the agent setting the bit acted as the bus master for the operation in which the error occurred
3) the parity error response bit (command register) is set
This bit is cleared by the host processor performing a read/clear operation on bit 8 of the PATUSR. |

Secondary ATU Command Register-SATUCMD

The bits in the Secondary ATU Command Register adhere to the definitions in the PCI Local Bus Specification and in most cases affect the behavior of the device on the secondary PCI bus.

TABLE 7q

Secondary ATU Command Register - SATUCMD

| Bit | Default | Read/Write | Description |
|---|---|---|---|
| 31:10 | 000000H | Read Only | Reserved |
| 09 | $0_2$ | Read/Write | Fast Back to Back Enable - If this bit is cleared, the secondary ATU interface is not allowed to generate fast back-to-back cycles on its bus. |
| 08 | $0_2$ | Read/Write | S_SERR# Enable - If this bit is cleared, the secondary ATU interface is not allowed to assert S_SERR# on the PCI interface. |
| 07 | $0_2$ | Read Only | Wait Cycle Control - controls address/data Stepping. Not implemented and a reserved bit field |
| 06 | $0_2$ | Read/Write | Parity Checking Enable - If this bit is set, then the secondary ATU interface must take normal action when a parity error is detected. If it is cleared, then parity checking is disabled. |
| 05 | $0_2$ | Read Only | VGA Palette Snoop Enable - The secondary ATU interface does not support I/O writes and therefore, does not perform VGA palette snooping. |
| 04 | $0_2$ | Read Only | Memory Write and Invalidate Enable - Not applicable. Not implemented and a reserved bit field |
| 03 | $0_2$ | Read Only | Special Cycle Enable - The ATU interface does not respond to special cycle commands in any way. Not applicable. Not implemented and a reserved bit field |
| 02 | $0_2$ | Read Write | Bus Master Enable - The secondary ATU interface has the ability to act as a master on the PCI bus. A value of 0 disables the device from generating PCI accesses. A value of 1 allows the device to behave as a bus master. This enable bit also controls the master interface of the DMA channels 0 and 1. The bit must be set before initiating an DMA transfer on the PCI bus. |
| 01 | $0_2$ | Read/Write | Memory Enable - Controls the secondary ATU interface's response to PCI memory addresses. If this bit is cleared, the ATU interface will not respond to any memory access on the PCI bus. |
| 00 | $0_2$ | Read Only | I/O Space Enable - Controls the ATU interface response to I/O transactions on the primary side. Not implemented and a reserved bit field. |

Secondary Outbound DAC Window Value Register-SODWVR

The Secondary Outbound DAC Window Value Register (SODWVR) contains the secondary PCI DAC address used to convert an local address. This address will be driven on the secondary PCI bus as a result of the secondary outbound ATU address translation. This register is used in conjunction with the Secondary Outbound Upper 64-Bit DAC Register.

The secondary DAC window is from local processor address 8180.000H to 81FF.FFFFH with the fixed length of 8 Mbytes.

TABLE 7r

Primary Outbound DAC Window Value Register - PODWVR

| Bit | Default | Read/Write | Description |
|---|---|---|---|
| 31:02 | 00000000H | Read/Write | Secondary Outbound DAC Window Value - This value the secondary ATU is used to convert local addresses to PCI addresses. |
| 01:00 | $00_2$ | Read Only | Burst Order - This bit field shows the address sequence during a memory burst. All targets must check the state of address bits zero and one to determine the memory addressing sequence that the initiator intends to use during the burst transfer. ($00_2$) Linear, or sequential, addressing sequence during the burst |

Secondary Outbound Upper 64-bit DAC Register-SOUDR

The Secondary Outbound Upper 64-bit DAC Register (SOUDR) defines the upper 32-bits of address used during a dual address cycle. This enables the secondary outbound ATU to directly address anywhere within the 64-bit host address space.

TABLE 7s

Secondary Outbound Upper 64-bit DAC Register - SOUDR

| Bit | Default | Read/Write | Description |
|---|---|---|---|
| 31:00 | 0000.0000H | Read/Write | Secondary Outbound Upper 64-bit DAC Address - These bits define the upper 32-bits of address driven during the dual address cycle (DAC). |

Primary Outbound Configuration Cycle Address Register-POCCAR

The Primary Outbound Configuration Cycle Address Register is used to hold the 32-bit PCI configuration cycle address. The local processor writes the PCI configuration cycles address which then enables the primary outbound configuration read or write. The local processor then performs a read or write to the Primary Outbound Configuration Cycle Data Register to initiate the configuration cycle on the primary PCI bus.

TABLE 7t

Primary Outbound Configuration Cycle Address Register - POCCAR

| Bit | Default | Read/Write | Description |
|---|---|---|---|
| 31:00 | 0000.0000H | Read Only | Primary Configuration Cycle Address - These bits define the 32-bit PCI address used during an outbound configuration read or write cycle. |

Secondary Outbound Configuration Cycle Address Register-SOCCAR

The Secondary Outbound Configuration Cycle Address Register is used to hold the 32-bit PCI configuration cycle address. The local processor writes the PCI configuration cycles address which then enables the secondary outbound configuration read or write. The local processor then performs a read or write to the Secondary Outbound Configuration Cycle Data Register to initiate the configuration cycle on the secondary PCI bus.

TABLE 7u

Secondary Outbound Configuration Cycle Address Register - SOCCAR

| Bit | Default | Read/Write | Description |
|---|---|---|---|
| 31:00 | 0000.0000H | Read Only | Secondary Configuration Cycle Address - These bits define the 32-bit PCI address used during an outbound configuration read or write cycle. |

Primary Outbound Configuration Cycle Data Register-POCCDR

The Primary Outbound Configuration Cycle Data Register is used to initiate a configuration read or write on the primary PCI bus. The register is logical rather than physical meaning that it is an address not a register. The local processor will read or write the data registers memory-mapped address to initiate the configuration cycle on the PCI bus with the address found in the POCCAR. For a configuration write, the data is latched from the local bus and forwarded directly to the ATU ODQ. For a read, the data is returned directly from the ATU IDQ to the local processor and is never actually entered into the data register (which does not physically exist).

The POCCDR is only useful from local processor address space and appears as a reserved value within the ATU configuration space.

Secondary Outbound Configuration Cycle Data Register-SOCCDR

The Secondary Outbound Configuration Cycle Data Register is used to initiate a configuration read or write on the secondary PCI bus. The register is logical rather than physical meaning that it is an address not a register. The local processor will read or write the data registers memory-mapped address to initiate the configuration cycle on the PCI bus with the address found in the SOCCAR. For a configuration write, the data is latched from the local bus and forwarded directly to the ATU ODQ. For a read, the data is returned directly from the ATU IDQ to the local processor and is never actually entered into the data register (which does not physically exist).

The SOCCDR is only useful from local processor address space and appears as a reserved value within the ATU configuration space.

Messaging Unit

The following is a description of the messaging unit of the P2P processor. The messaging unit is closely related to the Primary Address Translation Unit (PATU) described above.

Overview

The messaging unit provides a mechanism for data to be transferred between the PCI system and the local processor and notifying the respective system of the arrival of new data through an interrupt. The messaging unit can be used to send and receive messages.

The messaging unit has five distinct messaging mechanisms. Each allows a host processor or external PCI agent and the P2P processor to communicate through message passing and interrupt generation. The five mechanisms are:

Message Registers
Doorbell Registers
Circular Queues
Index Registers
APIC Registers The message registers allow the P2P processor and external PCI agents to communicate by passing messages in one of four 32-bit message registers. In this context, a message is any 32-bit data value. Message registers combine aspects of mailbox registers and doorbell registers. Writes to the message registers may optionally cause interrupts.

The doorbell registers allow the P2P processor to assert the PCI interrupt signals and allow external PCI agents to generate an interrupt to the local processor.

The circular queues support a message passing scheme that uses 4 circular queues.

The index registers supports a message passing scheme that uses a portion of the P2P processor local memory to implement a large set of message registers.

The APIC registers support the APIC bus interface unit by providing an external PCI interface for accessing APIC registers.

Theory Of Operation

The messaging unit has five unique messaging mechanisms.

The message registers are similar to a combination of mailbox and doorbell registers.

The doorbell registers support both hardware and software interrupts. The doorbell registers have two purposes:

Generate an interrupt when written.

Hold the status of interrupts generated by the other messaging unit mechanisms.

The messaging unit uses the first 4 Kbytes of the primary inbound translation window in the Primary Address Translation Unit (PATU). The address of the primary inbound translation window is contained in the Primary Inbound ATU Base Address Register.

Table 8 provides a summary of the five messaging mechanisms used in the messaging unit.

TABLE 8

Messaging Unit Summary

| Mechanism | Quantity | Assert PCI Interrupt Signals? | Generate Local Processor Interrupt? |
| --- | --- | --- | --- |
| Message Registers | 2 Inbound 2 Outbound | Yes | Optional |
| Doorbell Registers | 1 Inbound 1 Outbound | Yes | Optional |
| Circular Queues | 4 Circular Queues | Under certain conditions | Under certain conditions |
| Index Registers | 1004 32-bit Memory Locations | No | Optional |
| APIC Registers | 1 Register Select 1 Window | No | Yes |

Message Registers

Messages can be sent and received by the P2P processor through the use of the message registers. When written, the message registers may cause an interrupt to be generated to either the local processor or the PCI interrupt signals. Inbound messages are sent by the host processor and received by the P2P processor.

Outbound messages are sent by the P2P processor and received by the host processor.

The interrupt status for outbound messages is recorded in the outbound doorbell register. Interrupt status for inbound messages is recorded in the inbound doorbell register.

Outbound Messages

When an outbound message register is written by the local processor, an interrupt may be generated on the P_INTA#, P_INTB#, P_INTC#, or P_INTD# interrupt lines. Which interrupt line used is determined by the value of the ATU Interrupt Pin Register.

The PCI interrupt is recorded in the Outbound Doorbell Register. The interrupt causes the Outbound Message bit to be set in the Outbound Doorbell Register. This is a Read/Clear bit that is set by the messaging unit hardware and cleared by software.

The interrupt is cleared when an external PCI agent writes a value of 1 to the Outbound Message bit in the Outbound Doorbell Register to clear the bit.

Inbound Messages

When an inbound message register is written by an external PCI agent, an interrupt may be generated to the local processor. The interrupt may be masked by the Mask bits in the Inbound Doorbell Mask Register.

The local processor interrupt is recorded in the inbound doorbell register. The interrupt causes the Inbound Message bit to be set in the inbound doorbell register. This is a Read/Clear bit that is set by the messaging unit hardware and cleared by software.

The interrupt is cleared when the local processor writes a value of 1 to the inbound message interrupt bit in the inbound doorbell register.

Doorbell Registers

There are two Doorbell Registers: the Inbound Doorbell Register and the Outbound Doorbell Register. The Inbound Doorbell Register allows external PCI agents to generate interrupts to the local processor. The Outbound Doorbell Register allows the local processor to generate a PCI interrupt. Both Doorbell Registers hold a combination of hardware generated and software generated interrupts. They contain interrupt status from other messaging unit mechanisms and they also allow software to set individual bits to cause an interrupt.

Outbound Doorbells

When the Outbound Doorbell Register is written by the local processor, an interrupt may be generated on the P_INTA#, P_INTB#, P_INTC#, or P_INTD# interrupt pins. An interrupt is generated if any of the bits in the doorbell register is written to a value of 1. Writing a value of 0 to any bit does not change the value of that bit and does not cause an interrupt to be generated. Once a bit is set in the Outbound Doorbell Register, it cannot be cleared by the local processor.

Which PCI interrupt pin used is determined by the value of the ATU Interrupt Pin Register.

The interrupt may be masked by the Mask bits in the Outbound Doorbell Mask Register. If the Mask bit is set for a particular bit, no interrupt is generated for that bit. The Outbound Doorbell Mask Register affects only the generation of the interrupt and not the values written to the Outbound Doorbell Register.

The interrupt is cleared when an external PCI agent writes a value of 1 to the bits in the Outbound Doorbell Register that are set. Writing a value of 0 to any bit does not change the value of that bit and does not clear the interrupt.

In summary, the local processor generates an interrupt by setting bits in the Outbound Doorbell Register and external PCI agents clear the interrupt by also setting bits in the same register.

Inbound Doorbells

When the Inbound Doorbell Register is written by an external PCI agent, an interrupt may be generated to the local processor. An interrupt is generated if any of the bits in the doorbell register is written to a value of 1. Writing a value of 0 to any bit does not change the value of that bit and does not cause an interrupt to be generated. Once a bit is set in the Inbound Doorbell Register, it cannot be cleared by any external PCI agent. The interrupt may be masked by the Mask bits in the Inbound Doorbell Mask Register. If the Mask bit is set for a particular bit, no interrupt is generated for that bit. The Doorbell Mask Register affects only the generation of the interrupt and not the values written to the Inbound Doorbell Register.

One bit in the Inbound Doorbell Register is reserved for an NMI interrupt. This interrupt can not be masked by the Inbound Doorbell Mask Register.

The interrupt is cleared when the local processor writes a value of 1 to the bits in the Inbound Doorbell Register that are set. Writing a value of 0 to any bit does not change the value of that bit and does not clear the interrupt.

Circular Queues

The messaging unit implements four circular queues. There are 2 inbound queues and 2 outbound queues. In this case, inbound and outbound refer to the direction of the flow of messages. Inbound messages are either new messages posted by other processors for the local processor to process or are empty or free messages that can be reused by other processors. Outbound messages are either posted messages by the local processor for other processors to process or are free messages that can be reused by the local processor.

The four Circular Queues are used to pass messages in the following manner. The two inbound queues are used to handle inbound messages and the outbound queues are used to handle outbound messages. One of the inbound queues is designated the Free queue and it contains inbound free messages. The other inbound queue is designated the Post queue and it contains inbound posted messages. Similarly, one of the outbound queues is designated the Free queue and the other outbound queue is designated the Post queue.

Secondary PCI Bus Arbitration Unit

This following is a description of the secondary PCI bus arbitration unit 53. The operation modes, setup, and implementation of the arbitration are described below.

Overview

The PCI local bus requires a central arbitration resource for every individual PCI bus within a system environment. PCI uses the concept of access based arbitration rather than the traditional time slot approach. Each device on a PCI bus will arbitrate for the bus for every time the device, functioning as a bus master, requires the bus for an access.

PCI arbitration utilizes a simple REQ# and GNT# handshake protocol. When a device requires the bus, it will assert its REQ# output. The arbitration unit 53 will allow the requesting agent access to the bus by the assertion of that agent's GNT# input. PCI arbitration is a "hidden" arbitration scheme where the arbitration sequence occurs in the background while some other bus master currently has control of the bus. This has the advantage of not consuming any PCI bandwidth for the overhead of bus arbitration. The only requirements placed on the PCI arbiter is that it must implement a fair arbitration algorithm. The arbitration algorithm chosen must guarantee that there will be no more than one GNT# active on an individual PCI bus at any one time.

Theory Of Operation

The secondary bus arbiter 53 supports up to 6 secondary bus masters plus the secondary bus interface itself. Each request can be programmed to one of three priority levels or be disabled. A memory mapped control register, programmed by the application software, sets the priorities for each of the bus masters. Each priority level is handled in a round-robin fashion. Round-robin is defined as a mechanism in which every device will have a turn as master of the bus. The sequence moves in a circular fashion. The next possible bus master will be directly in front of the current bus master and the previous bus master will be directly behind the current bus master.

The round-robin arbitration scheme supports three levels of round-robin arbitration. The three levels define a low, medium, and high priority. Using the round-robin mechanism ensures that for each level of priority there will be a winner. To enforce the concept of fairness, a slot is reserved for the winner of each priority level (except the highest) in the next highest priority. If the winner of a priority level is not granted the bus during that particular arbitration sequence, it will be promoted to the next highest level of priority. Once it has been granted the bus, it will return to its preprogrammed priority. By reserving this slot, the algorithm guarantees fairness by allowing lower priority requests to be promoted through the priority mechanism to the point of being the highest priority device and being granted the bus in the next opening.

The arbiter interfaces to all requesting agents on the bus through the REQ#-GNT# protocol. A bus master will assert its REQ# output and wait for its GNT# input to be asserted. An agent can be granted the bus while a previous bus owner still has control. The arbiter is only responsible for deciding which PCI device is assigned the bus next. Each individual PCI device is responsible for determining when the bus actually becomes free and it is allowed to start its bus access.

The secondary bus arbiter 53 is capable of being disabled through the programming interface to allow the implementation of a custom arbitration algorithm. When disabled, one set of REQ#-GNT# signals will serve as the arbitration signals for the P2P secondary PCI interface.

Priority Mechanism

The priority mechanism is programmable by either the BIOS code or application software. The priority of the individual bus master will determine which level the device will be placed in the round-robin scheme. This priority determines the starting priority or the lowest priority the device shall be. If the application programs the device for low priority, the device may be promoted up to medium and then high priority until it is granted the local bus. Once granted, the device will be reset to the programmed priority and may re-initiate the arbitration once again. Further details needed for implementing a suitable secondary PCI bus arbitration unit should be well within the abilities of a person skilled in the field of the invention.

DMA Controller

The following is a description of the integrated Direct Memory Access (DMA) Controller utilized in the present invention. The operation modes, setup, external interface, and implementation of the DMA Controller are described below.

Overview

The DMA Controller provides low-latency, high-throughput data transfer capability. The DMA Controller optimizes block transfers of data between the PCI bus and the local processor memory. The DMA is an initiator on the PCI bus with PCI burst capabilities to provide a maximum throughput of 132 Mbytes/sec at 33 MHz.

The DMA Controller hardware is responsible for executing data transfers and for providing the programming interface. The DMA Controller features:

Three Independent Channels

Utilization of the P2P Memory Controller Interface $2^{32}$ addressing range on the local processor interface $2^{64}$ addressing range on the primary and secondary PCI interfaces by using PCI Dual Address Cycle (DAC)

Independent PCI interfaces to the primary and secondary PCI buses

Hardware support for unaligned data transfers for both the PCI bus and the local processor local bus Full 132 Mbytes/sec burst support for both the PCI bus and the P2P local bus Direct addressing to and from the PCI bus Fully programmable from the local processor Support for automatic data chaining for gathering and scattering of data blocks Demand Mode Support for external devices on DMA channel 0

Figure 7:
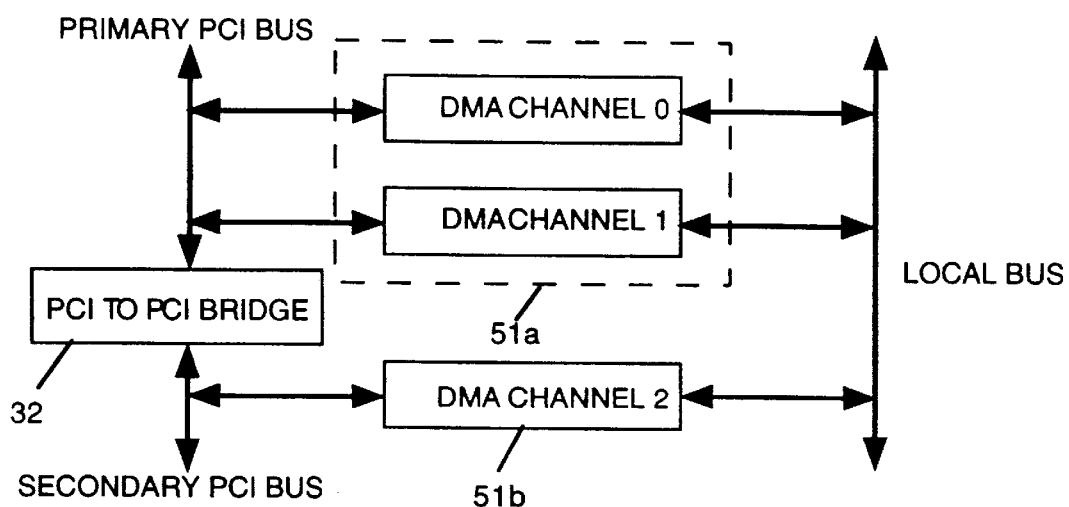
FIG. 7 is a block diagram showing the connections of the DMA controllers to the various buses.

FIG. 7 shows the connections of the DMA channels to the PCI busses.

Theory Of Operation

The DMA Controller 51a and 51b provides three channels of high throughput PCI-to-memory transfers. Channels 0 and 1 transfer blocks of data between the primary PCI bus and the local processor local memory. Channel 2 transfers blocks of data between the secondary PCI bus and the local processor local memory. All channels are identical, except for Channel 0. It has additional support for demand mode transfers. Each channel has a PCI bus interface and a local processor local bus interface.

Each DMA channel uses direct addressing for both the PCI bus and the local processor local bus. It supports data transfers to and from the full 64-bit address range of the PCI bus. This includes 64-bit addressing using PCI DAC command. The channel provides a special register which contains the upper 32 address bits for the 64-bit address. The DMA channels do not support data transfers that cross a 32-bit address boundary.

Further details necessary for implementing a suitable DMA mechanism for use in the present invention should be well with the abilities of a person skilled in the field of the invention.

Memory Controller

The following is a description of the integrated memory controller 47 utilized in the present invention. The operation modes, setup, external interface, and implementation of the memory controller are described below.

Overview

The P2P processor integrates a main memory controller 47 to provide a direct interface between the P2P processor and a memory system 33. The memory controller supports:

Up to 256 Mbytes of 32-bit or 36-bit (32-bit memory data plus 4 parity bits) DRAM Interleaved or Non-Interleaved DRAM Fast Page-Mode (FPM) DRAM Extended Data Out (EDO) DRAM Burst Extended Data Out (BEDO) DRAM Two independent memory banks for SRAM/ROM Up to 16 Mbytes (per bank) of 8-bit or 32-bit SRAM/ROM The memory controller generates the row-address strobe (RAS#), column-address strobe (CASe), write enables (WE#) and 12-bit multiplexed addresses (MA[11:0]) for the DRAM array. For interleaved DRAM, the DRAM address-latch enable (DALE#) and LEAF# signals are provided for address and data latching.

The memory controller support two banks of SRAM, ROM or flash memory. Each bank supports from 64 Kbytes to 16 Mbytes of memory. Each bank can independently be configured for 8-bit or 32-bit wide memory. The chip enable (CE#), memory write enable (MWE#) and incrementing burst address for SRAM/ROM are provided by the memory controller.

Figure 8:
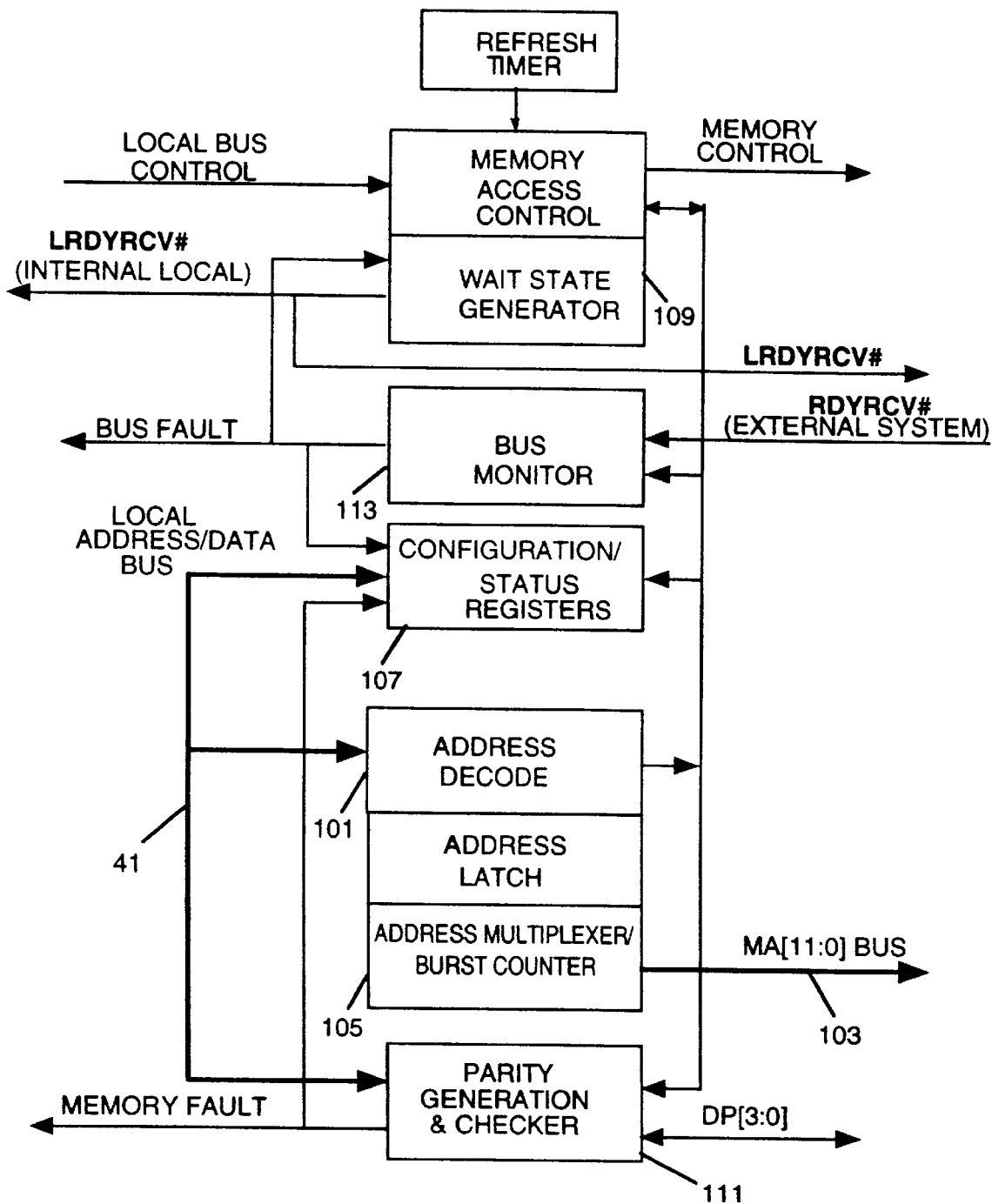
FIG. 8 is a block diagram of the memory controller.

An overview of the memory controller integrated into the P2P processor is provided in FIG. 8.

Theory Of Operation

The memory controller 47 optimally translates the burst access protocol of the local bus masters to the access protocol supported by the memory being addressed. Address decode 101 decodes local bus addresses presented on the internal address/data bus 41, and generates the proper address and control signals to the memory array 33 connected to the memory controller. Burst accesses generated by local-bus masters provide the first address. The memory controller provides an incremented address which is presented to the memory array on the MA[11:0] pins. The address is incremented until either the cycle has been completed by the local-bus master signified by asserting the BLAST# signal or a local bus parity error (for DRAM read cycles) occurs. The maximum burst size for a single data transfer cycle is 2 Kbytes. Local bus masters are responsible for keeping track of the incrementing burst count and ending data transfers when reaching a 2 Kbyte address boundary.

The address presented on the MA[11:0] bus 103 depends on the type of memory bank addressed. For DRAM, the MA[11:0] provide the multiplexed row and column address. The column address increments to the nearest 2 Kbyte address boundary. For both SRAM and FLASH/ROM memory banks, the MA[11:0] bus is based on the address presented on the AD[13:2] signals during the address phase. For burst data, the burst counter 105 will increment the address to the nearest 2 Kbyte boundary.

The memory controller generates the number of wait states as programmed into the memory controller registers 107 for controlling the signals connected to the memory arrays. In addition, the WAIT# signal provides the local bus masters (except the local processor) to indicate additional wait states by wait state generator 109 are required during a memory access.

Byte wide data parity-generation and checking unit 111 can be enabled for DRAM arrays. Parity checking will provide a memory fault error upon detection of a parity error. The faulting word ddress is captured in a register.

The memory controller provides a bus monitor 113 for detecting address ranges which do not return a external RDYRCV# signal. This mechanism is designed to detect accesses to undefined address ranges. Upon detection of an error, the wait state generator generates an internal LRDYRCV# to complete the bus accesses and an optionally generates an bus fault signal.

Further details necessary for implementing a suitable memory controller for use with the invention should be apparent to persons skilled in the field of the invention.

PCI And Peripheral Interrupt Controller

This following is a description of the P2P processor interrupt controller support. The operation modes, setup, external memory interface, and implementation of the interrupts are described below.

Overview

The PCI And Peripheral Interrupt Controller (PPIC) 67 provides the ability to generate interrupts to both the local processor and the PCI bus. The P2P processor contains a number of peripherals which may generate an interrupt to the local processor. These devices include:

DMA Channel 0

Primary ATU

DMA Channel 1

Secondary ATU

DMA Channel 2

I²C Bus Interface Unit

Bridge Primary Interface

APIC Bus Interface Unit

Bridge Secondary Interface

Messaging Unit

In addition to the internal devices, external devices may also generate interrupts to the local processor. External devices can generate interrupts via the XINT7:0# pins and the NMI# pin.

The PCI And Peripheral Interrupt Controller provides the ability to direct PCI interrupts. The routing logic enables, under software control, the ability to intercept the external secondary PCI interrupts and forward to the primary PCI interrupt pins. The i960 Jx Microprocessor User's Manual further describes the local processor interrupt and interrupt priority mechanisms. The user manual also provides a full explanation of the various modes of operation for the local processor interrupt controller.

Theory Of Operation

The PCI And Peripheral Interrupt Controller has two functions:

Internal Peripheral Interrupt Control

PCI Interrupt Routing

The peripheral interrupt control mechanism consolidates a number of interrupt sources for a given peripheral into a single interrupt driven to the local processor. In order to provide the executing software with the knowledge of interrupt source, there is a memory-mapped status register that describes the source of the interrupt. All of the peripheral interrupts are individually enabled from the respective peripheral control registers.

The PCI interrupt routing mechanism allows the host software (or local processor software) to route PCI interrupts to either the local processor or the P_INTA#, P_INTB#, P_INTC#, and P_INTD# output pins. This routing mechanism is controlled through a memory-mapped register accessible from the primary PCI bridge configuration space or the P2P processor local bus.

Local Processor Interrupts

The interrupt controller on the local processor has eight external interrupt pins and one non-maskable interrupt pin for detecting external interrupt requests. The eight external pins can be configured for one of three modes: dedicated, expanded, and mixed. In dedicated mode, the pins may be individually mapped to interrupt vectors. In expanded mode, the pins may be interpreted as a bit field which can represent an interrupt vector. In this mode, up to 240 vectors can be directly requested with the interrupt pins. In mixed mode, five pins operate in expanded mode and can request 32 different interrupts and three pins operate in dedicated mode.

The nine interrupt pins of the local processor have the following definitions and programming options:

XINT7:0# External Interrupt (Input)—These pins cause interrupts to be requested. Pins are software configurable for three modes: dedicated, expanded, mixed. Each pin can be programmed as an edge-detect input or as a level-detect input. Additionally, a debouncing mode for these pins can be selected under program control.

NMI# Non-Maskable Interrupt (Input)—Causes a non-maskable interrupt event to occur. NMI is the highest priority interrupt recognized. The NMI# pin is an edge-activated input. A debouncing mode for NMI# can be selected under program control. This pin is internally synchronized.

For correct operation of the P2P processor, the local processor external interrupt pins must be programmed for direct mode operation only, level-sensitive interrupts, and fast sampling mode. This is done through the Interrupt Control Register (ICON) in the local processor memory-mapped register space. The i960 Jx Microprocessor User's Manual provides full details on programming the local processor interrupt controller.

Utilization of the P2P interrupt mechanism relies on the configuration of the local processor interrupt controller and XINT Select bit in the PCI Interrupt Routing Select Register. Table 9 describes the operational modes and functionality enabled of the local processor interrupt controller and Table 10 describes the usage of the XINT select bit.

TABLE 9

P2P Interrupt Controller Programming Summary

Local Processor Interrupt Controller Mode

| Dedicated Mode | Expanded Mode | Mixed Mode | ICON.im | Level-Triggered Interrupt | Edge-Triggered Interrupt | ICON.sdm | Sampling Mode | ICON.sm | Local Processor Interrupt |
|---|---|---|---|---|---|---|---|---|---|
| Enabled | Disabled | Disabled | $00_2$ | Enabled | Disabled | $0_2$ | fast | $1_2$ | XINT0#/INTA# |
| Enabled | Disabled | Disabled | $00_2$ | Enabled | Disabled | $0_2$ | fast | $1_2$ | XINT1#/INTB# |
| Enabled | Disabled | Disabled | $00_2$ | Enabled | Disabled | $0_2$ | fast | $1_2$ | XINT2#/INTC# |
| Enabled | Disabled | Disabled | $00_2$ | Enabled | Disabled | $0_2$ | fast | $1_2$ | XINT3#/INTD# |
| Enabled | Disabled | Disabled | $00_2$ | Enabled | Disabled | $0_2$ | fast | $1_2$ | XINT4# |
| Enabled | Disabled | Disabled | $00_2$ | Enabled | Disabled | $0_2$ | fast | $1_2$ | XINT5# |
| Eaabled | Disabled | Disabled | $00_2$ | Enabled | Disabled | $0_2$ | fast | $1_2$ | XINT6# |
| Enabled | Disabled | Disabled | $00_2$ | Enabled | Disabled | $0_2$ | fast | $1_2$ | XINT7# |
| N/A | N/A | N/A | N/A | N/A | Default | N/A | fast | $1_2$ | NMI# |

Operational Blocks

Figure 9:
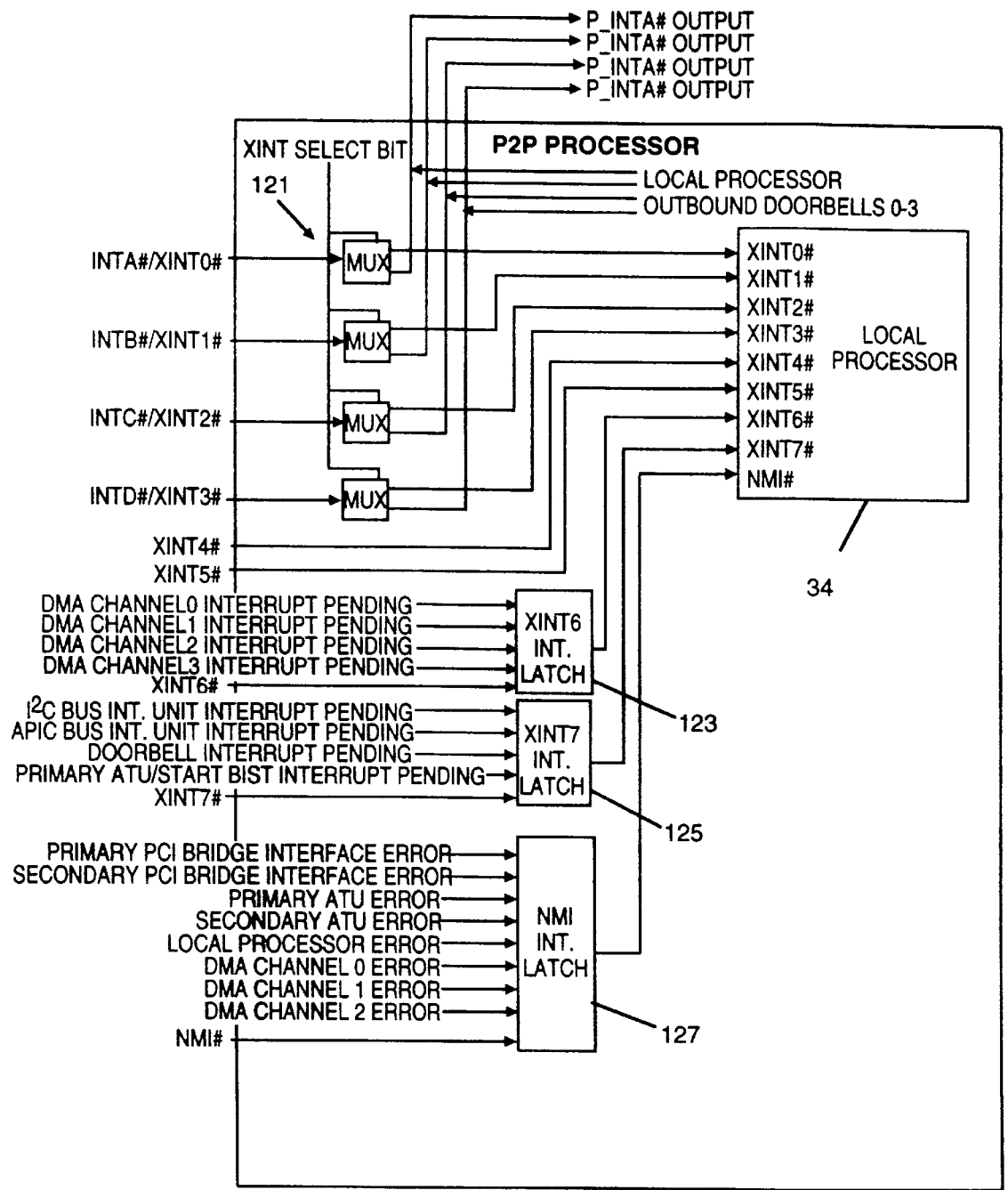
FIG. 9 is a block diagram showing the connections between the local processor and the PPIC.

The PCI and Peripheral Interrupt Controller provides the connections to the local processor. These connections are shown in FIG. 9.

PCI Interrupt Routing

The four PCI interrupt inputs can be routed by MUXes 121 to either local processor interrupt inputs or to PCI Interrupt output pins. Routing of interrupt inputs is controlled by the XINT Select bit in the PCI Interrupt Routing Select Register as shown in Table 10.

TABLE 10

PCI Interrupt Routing Summary

| XINT Select bit | Description |
|---|---|
| 0 | INTA#/XINT0# Input Pin Routed to Local Processor XINT0# Input Pin<br>INTB#/XINT1# Input Pin Routed to Local Processor XINT1# Input Pin<br>INTC#/XINT2# Input Pin Routed to Local Processor XINT2# Input Pin<br>INTD#/XINT3# Input Pin Routed to Local Processor XINT3# Input Pin |
| 1 | INTA#/XINT0# Input Pin Routed to P_INTA# Output Pin<br>INTB#/XINT1# Input Pin Routed to P_INTB# Output Pin<br>INTC#/XINT2# Input Pin Routed to P_INTC# Output Pin<br>INTD#/XINT3# Input Pin Routed to P_INTD# Output Pin |

As stated earlier, XINT0# through XINT3# of the local processor must be programmed to be level sensitive to accommodate PCI interrupts. In addition, the logic external to the local processor input must drive an inactive level (a '1') when the XINT Select bit is set.

Internal Peripheral Interrupt Routing

The XINT6#, XINT7#, and NMI# interrupt inputs on the local processor receive inputs from multiple internal interrupt sources. There is one internal latch before each of these three inputs that provides the necessary multiplexing of the different interrupt sources. Application software can determine which peripheral unit caused the interrupt by reading the corresponding interrupt latch. More detail about the exact cause of the interrupt can be determined by reading status from the peripheral unit.

The XINT6# interrupt of the local processor receives interrupts from the external pin and the three DMA channels. Each DMA channel interrupt is either for DMA End of Transfer interrupt or DMA End of Chain interrupt. The XINT6 Interrupt Latch 123 accepts the interrupt inputs from the DMA channels as well as the external XINT6# pin. A valid interrupt from any of these sources sets the bit in the latch and outputs a level-sensitive interrupt to the local processor XINT6# input. The interrupt latch should continue driving an active low input to the processor interrupt input as long as a one is present in the latch. The XINT6 Interrupt Latch is read through the XINT6 Interrupt Status Register. The XINT6 Interrupt Latch is cleared by clearing the source of the interrupt at the internal peripheral.

The unit interrupt sources which drive the inputs to the XINT6 Interrupt Latch are detailed in Table 11.

TABLE 11

XINT6 Interrupt Sources

| Unit | Interrupt Condition | Register | Bit Position |
|---|---|---|---|
| DMA Channel 0 | End of Chain | Channel Status Register 0 | 08 |
| | End of Transfer | Channel Status Register 0 | 09 |
| DMA Channel 1 | End of Chain | Channel Status Register 1 | 08 |
| | End of Transfer | Channel Status Register 1 | 09 |
| DMA Channel 2 | End of Chain | Channel Status Register 2 | 08 |
| | End of Transfer | Channel Status Register 2 | 09 |

The XINT7# interrupt on the local processor receives interrupts from the external pin, the APIC Bus Interface Unit, the $I^2C$ Bus Interface Unit, the Primary ATU, and the Messaging Unit. The XINT7 Interrupt Latch 125 accepts the one interrupt input from each of the four units above as well as the external XINT7# pin. A valid interrupt from any of these sources sets the bit in the latch and outputs a level-sensitive interrupt to the local processor XINT7# input. The interrupt latch should continue driving an active low input to the processor interrupt input as long as a one is present in the latch. The XINT7 Interrupt Latch is read through the XINT7 Interrupt Status Register. The XINT7 Interrupt Latch is cleared by clearing the source of the interrupt at the internal peripheral.

The unit interrupt sources which drive the inputs to the XINT7 interrupt latch are detailed in Table 12.

TABLE 12

XINT7 Interrupt Sources

| Unit | Error Condition | Register | Bit Position |
|---|---|---|---|
| APIC Bus Interface Unit | EOI Message Received | APIC Control/Status Register | 14 |
| | APIC Message Sent | APIC Control/Status Register | 06 |
| $I^2C$ Bus Interface Unit | Receive Buffer Full | $I^2C$ Status Register | 07 |
| | Transmit Buffer Empty | $I^2C$ Status Register | 06 |
| | Slave Address Detect | $I^2C$ Status Register | 05 |
| | STOP Detected | $I^2C$ Status Register | 04 |
| | Bus Error Detected | $I^2C$ Status Register | 03 |
| | Arbitration Lost Detected | $I^2C$ Status Register | 02 |
| Messaging Unit | Doorbell Interrupt | Primary ATU Interrupt Status Register | 09 |
| Primary ATU | ATU BIST Start | Primary ATU Interrupt Status Register | 08 |

The Non-Maskable Interrupt (NMI) on the local processor receives interrupts from the external pin, the primary and secondary ATUs, the primary and secondary bridge interfaces, the local processor and each of the three DMA channels. Each one of these eight interrupts represents an error condition in the peripheral unit. The NMI Interrupt Latch 127 accepts the one interrupt inputs from each of the eight sources above and the external NMI# pin. A valid interrupt from any of these sources sets the bit in the latch and outputs an edge-triggered interrupt to the local processor NMI# input. The NMI Interrupt Latch is read through the NMI Interrupt Status Register. The NMI Interrupt Latch is cleared by clearing the source of the interrupt at the internal peripheral.

The unit interrupt sources which drive the inputs to the NMI interrupt latch are detailed in Table 13.

TABLE 13

NMI Interrupt Sources

| Unit | Error Condition | Register | Bit Position |
|---|---|---|---|
| Primary PCI Bridge Interface | PCI Master Parity Error | Primary Bridge Interrupt Status Register | 00 |
| | PCI Target Abort (target) | Primary Bridge Interrupt Status Register | 01 |
| | PCI Target Abort (master) | Primary Bridge Interrupt Status Register | 02 |
| | PCI Master Abort | Primary Bridge Interrupt Status Register | 03 |
| | P_SERR# Asserted | Primary Bridge Interrupt Status Register | 04 |
| Secondary PCI Bridge Interface | PCI Master Parity Error | Secondary Bridge Interrupt Status Register | 00 |
| | PCI Target Abort (target) | Secondary Bridge Interrupt Status Register | 01 |
| | PCI Target Abort (master) | Secondary Bridge Interrupt Status Register | 02 |
| | PCI Master Abort | Secondary Bridge Interrupt Status Register | 03 |
| | S_SERR# Asserted | Secondary Bridge Interrupt Status Register | 04 |
| Primary ATU | PCI Master Parity Error | Primary ATU Interrupt Status Register | 00 |
| | PCI Target Abort (target) | Primary ATU Interrupt Status Register | 01 |
| | PCI Target Abort (master) | Primary ATU Interrupt Status Register | 02 |
| | PCI Master Abort | Primary ATU Interrupt Status Register | 03 |
| | P_SERR# Asserted | Primary ATU Interrupt Status Register | 04 |
| | Local Processor Bus Fault | Primary ATU Interrupt Status Register | 05 |
| | Local Processor Memory Fault | Primary ATU Interrupt Status Register | 06 |
| Secondary ATU | PCI Master Parity Error | Secondary ATU Interrupt Status Register | 00 |
| | PCI Target Abort (target) | Secondary ATU Interrupt Status Register | 01 |
| | PCI Target Abort (master) | Seconcary ATU Interrupt Status Register | 02 |
| | PCI Master Abort | Secondary ATU Interrupt Status Register | 03 |
| | S_SERR# Asserted | Secondary ATU Interrupt Status Register | 04 |
| | Local Processor Bus Fault | Secondary ATU Interrupt Status Register | 05 |
| | Local Processor Memory Fault | Secondary ATU Interrupt Status Register | 06 |
| Local Processor | Local Processor Bus Fault | Local Processor Status Register | 05 |
| | Local Processor Memory Fault | Local Processor Status Register | 06 |
| DMA Channel 0 | PCI Master Parity Error | Channel Status Register 0 | 00 |
| | PCI Target Abort (master) | Channel Status Register 0 | 02 |
| | PCI Master Abort | Channel Status Register 0 | 03 |
| | Local Processor Bus Fault | Channel Status Register 0 | 05 |
| | Local Processor Memory Fault | Channel Status Register 0 | 06 |
| DMA Channel 1 | PCI Master Parity Error | Channel Status Register 1 | 00 |
| | PCI Target Abort (master) | Channel Status Register 1 | 02 |
| | PCI Master Abort | Channel Status Register 1 | 03 |
| | Local Processor Bus Fault | Channel Status Register 1 | 05 |
| | Local Processor Memory Fault | Channel Status Register 1 | 06 |
| DMA Channel 2 | PCI Master Parity Error | Channel Status Register 2 | 00 |
| | PCI Target Abort (master) | Channel Status Register 2 | 02 |
| | PCI Master Abort | Channel Status Register 2 | 03 |
| | Local Processor Bus Fault | Channel Status Register 2 | 05 |
| | Local Processor Memory Fault | Channel Status Register 2 | 06 |

The PCI Interrupt Routing Select Register, XINT6 Interrupt Status Register, XINT7 Interrupt Status Register, and NMI Interrupt Status Register are described below.

P2P Processor External Interrupt Interface

The external interrupt input interface for the P2P processor consists of the following pins:

TABLE 14

Interrupt Input Pin Descriptions

| Signal | Description |
|---|---|
| INTA#/XINT0# | This interrupt input can be directed to the P_INTA# output or the local processor interrupt input XINT0. |
| INTB#/XINT1# | This interrupt input can be directed to the P_INTB# output or the local processor interrupt input XINT1. |
| INTC#/XINT2# | This interrupt input can be directed to the P_INTC# output or the local processor interrupt input XINT2. |
| INTD#/XINT3# | This interrupt input can be directed to the P_INTD# output or the local processor interrupt input XINT3. |
| XINT4# | This interrupt input is always connected to the local processor interrupt input XINT4. |
| XINT5# | This interrupt input is always connected to the local processor interrupt input XINT5. |
| XINT6# | This interrupt input is shared with three internal interrupts. They are the interrupts from each of the internal DMA channels. All of the interrupts are directed to the local processor interrupt input XINT6#. The software must read the XINT6 Interrupt Status Register to determine the exact source of the interrupt. |
| XINT7# | This interrupt input is shared with four internal interrupts. They are the interrupts from the APIC Bus Interface Unit, the 12C Bus Interface Unit, the Primary ATU, the Messaging Unit. All of the interrupts are directed to the local processor interrupt input XINT7#. The software must read the XINT7 Interrupt Status Register to determine the exact source of the interrupt. |
| NMI# | This interrupt input is shared with eight internal interrupts. They include the collected error interrupts from the local processor, primary PCI bridge interface, secondary PCI bridge interface, primary ATU, and secondary ATU, and the three DMA channels. All of the interrupts are directed to the local processor NMI# input. The software must read the NMI Interrupt Status Register to determine the exact source of the interrupt. |

PCI Outbound Doorbell Interrupts

The P2P processor has the capability of generating interrupts on any of the primary PCI interrupt pins. This is done by setting a bit within the Doorbell Port Register within the primary ATU.

Bits 0 through 3 correspond to P_INTA# through P_INTD# respectively. Setting a bit within the register will generate the corresponding PCI interrupt.

Register Definitions

There are four control and status registers for the PCI And Peripheral Interrupt Controller:

PCI Interrupt Routing Select Register

XINT6 Interrupt Status Register

XINT7 Interrupt Status Register

NMI Interrupt Status Register

Each is a 32-bit register and is memory-mapped in the local processor memory space.

All of the registers are visible as P2P memory mapped registers and can be accessed through the internal memory bus. The PCI Interrupt Routing Select Register is accessible from the internal memory bus and through the PCI configuration register space (function #0).

PCI Interrupt Routing Select Register—PIRSR

The PCI Interrupt Routing Select Register (PIRSR) determines the routing of the external input pins. The input pins consist of four secondary PCI interrupt inputs which are routed to either the primary PCI interrupts or local processor interrupts. The PCI interrupt pins are defined as "level sensitive," asserted low. The assertion and deassertion of the interrupt pins are asynchronous to the PCI or processor clock.

If the secondary PCI interrupt inputs are routed to the primary PCI interrupt pins, the local processor XINT3:0# inputs must be set inactive.

XINT6 Interrupt Status Register—X6ISR

The XINT6 Interrupt Status Register (X6ISR) shows the current pending XINT6 interrupts. The source of the XINT6 interrupt can be the internal peripheral devices connected through the XINT6 Interrupt Latch or the external XINT6# input pin. The interrupts which can be generated on the XINT6# input are described above with reference to Internal Peripheral Interrupt Routing.

The X6ISR is used by application software to determine the source of an interrupt on the XINT6# input and to clear that interrupt. All bits within this register are defined as read only. The bits within this register are cleared when the source of the interrupt (status register source shown in Table 11) are cleared. The X6ISR will reflects the current state of the input to the XINT6 Interrupt Latch.

Due to the asynchronous nature of the P2P peripheral units, multiple interrupts can be active when the application software reads the X6ISR register. The application software must handle these multiple interrupt conditions appropriately. In addition, the application software may subsequently read the X6ISR register to determine if additional interrupts have occurred during the interrupt processing for the prior interrupts. All of the interrupts from the X6ISR register will be at the same priority level within the local processor (The i960 Jx Microprocessor User's Manual provides a description for setting the interrupt priority mechanism).

Table 15 details the definition of the X6ISR.

TABLE 15

XINT6 Interrupt Status Register - X6ISR

| Bit | Default | Read/Write | Description |
| --- | --- | --- | --- |
| 31:04 | 0000000H | Read Only | Reserved |
| 03 | $0_2$ | Read Only | External XINT6# Interrupt Pending - when set, an interrupt is pending on the external XINT6# input. When clear, no interrupt exists. |
| 02 | $0_2$ | Read Only | DMA Channel 2 Interrupt Pending - when set, an end of chain of channel active condition has been signaled by DMA channel 2. When clear, no interrupt condition exists. |
| 01 | $0_2$ | Read Only | DMA Channel 1 Interrupt Pending - when set, an end of chain of channel active condition has been signaled by DMA channel 1. When clear, no interrupt condition exists. |
| 00 | $0_2$ | Read Only | DMA Channel 0 Interrupt Pending - when set, an end of chain of channel active condition has been signaled by DMA channel 0. When clear, no interrupt condition exists. |

XINT7 Interrupt Status Register—X7ISR

The XINT7 Interrupt Status Register (X7ISR) shows the current pending XINT7 interrupts. The source of the XINT7 interrupt can be the internal peripheral devices connected through the XINT7 Interrupt Latch or the external XINT7# input pin.

The X7ISR is used by application software to determine the source of an interrupt on the XINT7# input and to clear that interrupt. All bits within this register are defined as read only. The bits within this register are cleared when the source of the interrupt (status register source shown in Table 12) are cleared. The X7ISR will reflects the current state of the input to the XINT7 Interrupt Latch.

Due to the asynchronous nature of the P2P peripheral units, multiple interrupts can be active when the application software reads the X7ISR register. The application software must handle these multiple interrupt conditions appropriately. In addition, the application software may subsequently read the X7ISR register to determine if additional interrupts have occurred during the interrupt processing for the prior interrupts. All of the interrupts from the X7ISR register will be at the same priority level within the local processor Table 16 details the definition of the X7ISR.

TABLE 16

XINT7 Interrupt Status Register - X7ISR

| Bit | Default | Read/Write | Description |
| --- | --- | --- | --- |
| 31:05 | 0000000H | Read Only | Reserved |
| 04 | $0_2$ | Read Only | External XINT7# Interrupt Pending - when set, an interrupt is pending on the external XINT7# input. When clear, no interrupt exists. |
| 03 | $0_2$ | Read Only | Primary ATU/Start BIST Interrupt Pending - when set, the host processor has set the start BIST request in the ATUBISTR register. When clear, no start BIST interrupt is pending. |
| 02 | $0_2$ | Read Only | Inbound Doorbell Interrupt Pending - when set, an interrupt from the Inbound Messaging Unit is pending. When clear, no interrupt is pending. |
| 01 | $0_2$ | Read Only | I2C Interrupt Pending - when set, an interrupt is from the I2C Bus |

TABLE 16-continued

XINT7 Interrupt Status Register - X7ISR

| Bit | Default | Read/Write | Description |
|---|---|---|---|
| 00 | $0_2$ | Read Only | Interface Unit is pending. When clear, no interrupt is pending. APIC Interrupt Pending - when set, an interrupt from the APIC Bus Interface Unit is pending. When clear, no interrupt is pending. |

NMI Interrupt Status Register—NISR

The NMI Interrupt Status Register (NISR) shows the current pending NMI interrupts. The source of the NMI interrupt can be the internal peripheral devices connected through the NMI Interrupt Latch or the external NMI# input pin.

The NMI Interrupt Status Register is used by application software to determine the source of an interrupt on the NMI# input and to clear that interrupt. All of the bits within the NISR are read only. The bits within this register are cleared when the source of the interrupt (status register source shown in Table 13) are cleared. The NISR reflects the current state of the input to the NMI Interrupt Latch.

Due to the asynchronous nature of the P2P peripheral units, multiple interrupts can be active when the application software reads the NISR register. The application software must handle these multiple interrupt conditions appropriately. In addition, the application software may subsequently read the NISR register to determine if additional interrupts have occurred during the interrupt processing for the prior interrupts. All of the interrupts from the NISR register are at the same priority level within the local processor).

Table 17 shows the bit definitions for reading the NMI interrupt status register.

TABLE 17

NMI Interrupt Status Register - NISR

| Bit | Default | Read/Write | Description |
|---|---|---|---|
| 31:09 | 000000H | Read Only | Reserved |
| 08 | $0_2$ | Read Only | External NMI# Interrupt - when set, an interrupt is pending on the external NMI# input. When clear, no interrupt exists. |
| 07 | $0_2$ | Read Only | DMA Channel 2 Error - when set, a PCI or local bus error condition exists within DMA channel. When clear, no error exists. |
| 06 | $0_2$ | Read Only | DMA Channel 1 Error - when set, a PCI or local bus error condition exists within DMA channel. When clear, no error exists. |
| 05 | $0_2$ | Read Only | DMA Channel 0 Error - when set, a PCI or local bus error condition exists within DMA channel. When clear, no error exists. |
| 04 | $0_2$ | Read Only | Secondary Bridge Error - when set, a PCI error condition exists within the secondary interface of the bridge. When clear, no error exists. |
| 03 | $0_2$ | Read Only | Primary Bridge Interface Error - when set, a PCI error condition exists within the primary interface of the bridge. When clear, no error exists. |
| 02 | $0_2$ | Read Only | Secondary ATU Error - when set, a PCI or local bus error condition exists within the secondary ATU. When clear, no error exists. |
| 01 | $0_2$ | Read Only | Primary ATU Error - when set, a PCI or local bus error condition exists within the primary ATU. When clear, no error exists. |
| 00 | $0_2$ | Read Only | Local Processor Error - when set, an error condition caused by the local processor exists within the internal memory controller. When clear, no error exists. |

Internal Arbitration

The following is a description of the internal arbitration of the P2P processor. This includes arbitration for the internal local bus as well as arbitration for each of the PCI interfaces within the processor. The operation modes, setup, external memory interface, and implementation of the arbitration are described below.

Local Bus Arbitration

The P2P processor requires an arbitration mechanism to control local bus ownership. Bus masters connected to the local bus consist of three DMA channels, primary PCI Address Translation Unit, secondary PCI Address Translation Unit, local processor, and external bus masters.

The Local Bus Arbitration Unit (LBAU) 57 implements a fairness algorithm which allows every bus master the opportunity to gain control of the local bus. The algorithm combines a round-robin scheme with a prioritizing mechanism. In the preferred embodiment, the implementation should allow the application to assign priorities to each local bus master independently.

The Local Bus Arbitration Unit is responsible for granting the local bus to a bus master. All bus masters contain logic to remove themselves as a bus master from the local bus once they have lost their internal GNT# signal. There is a programmable 12-bit counter to limit the amount of time a bus master has control of the local bus and to dictate when a bus master must relinquish ownership if other bus masters are requesting the local bus.

External bus masters may be used on the local bus by adding external logic to control HOLD/HOLDA. The P2P processor allows for one external bus master to participate in the fairness algorithm. If more than one external bus master is used on the local bus, external logic is required to treat all external devices as one device (detects HOLD and drives HOLDA).

The Local Bus Arbitration Unit controls the local processor backoff unit. This unit allows the local processor to be "backed off" of the local bus to prevent possible deadlock situations. While in backoff, the processor is held in wait-states (L_RDYRCV# inactive). Internal buffers tri-state the multiplexed address/data bus allowing other local bus masters (ATU, DMA, etc.) to control the bus and therefore prevent the situation where an outbound transaction requires the resources being used by an inbound transaction. Additionally, the backoff unit optimizes local bus performance during all outbound processor reads.

In addition to the Local Bus Arbitration Unit, the P2P processor contains two local PCI arbitration units. The local primary arbitration unit 55a controls access to the internal primary PCI bus. Arbitration occurs for the primary PCI bus between the primary ATU, DMA channels 0 and 1, and the primary interface of the PCI to PCI Bridge Unit. The local secondary arbitration 55b unit controls access to the internal secondary PCI bus. Arbitration occurs for the secondary PCI bus between the secondary ATU, DMA channel 2, and the secondary interface of the PCI to PCI Bridge Unit. Both local PCI arbitration units function in a similar manner. Preferably, the arbitration logic should be designed to allow multiple bus masters control of the local bus. When a bus master requests the local bus, the Local Bus Arbitration Unit should first obtain control of the local bus from the local processor by asserting the HOLD request signal. The local processor should grant the bus to the arbitration logic by asserting the HOLDA signal and placing the processor signal pins in the tri-state mode. The arbitration logic should then grant the other bus master the local bus by returning the respective internal GNT# signal.

Internal PCI Bus Arbitration

Figure 10:
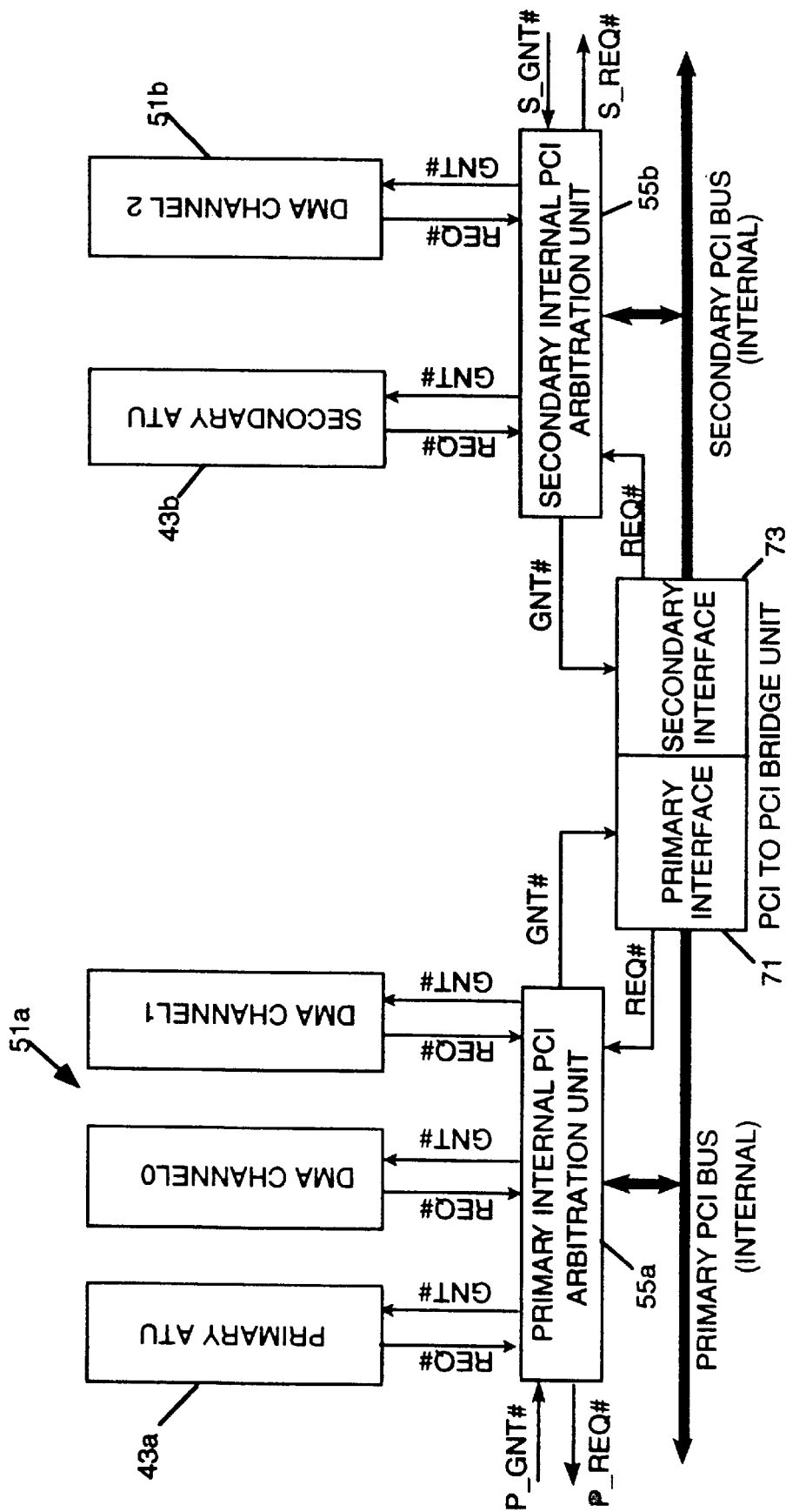
FIG. 10 is a block diagram showing the connections of the internal PCI arbitration units.

The P2P processor contains two internal arbitration units which control access to the internal PCI buses within the device. FIG. 10 shows a diagram of these internal arbitration units and the resources they control.

The Primary Internal PCI Arbitration Unit arbitrates for the following internal units:
  Primary Bridge Interface
  Primary ATU
  DMA Channel 0
  DMA Channel 1

The Secondary Internal PCI Arbitration Unit arbitrates for the following internal units:
  Secondary Bridge Interface
  Secondary ATU
  DMA Channel 2

Each internal PCI arbitration unit uses a fixed round-robin arbitration scheme with each device on a bus having equal priority.

The fixed round-robin arbitration is interpreted in the following manner:
  After reset, the token for arbitration belongs to device #1 within each internal PCI arbitration unit.
  Arbitration is performed on every clock that a device asserts an internal REQ# to the arbiter.
  The next owner of the token (i.e. the bus) will be the closest device number to the current owner (or last is the bus is idle). For example if device #3 is the current owner and device #4 and device #1 are requesting the bus, device #4 will win.
  The token is passed when the arbiter activates an internal grant to the internal bus master. This is the arbiter's grant signal. The actual outputs to the internal bus masters are still masked with the external GNT# input.

Theory of Operation

Each unit on an internal PCI bus requests use of the PCI bus for a master operation. Arbitration occurs whenever a resource attached to an internal bus activates a request (REQ#). Grant is made to the next resource in the round-robin scheme. The granting of the internal PCI bus is tied to the state of the external PCI bus. The state of the external request pins (P_REQ# or S_REQ#) is a direct reflection of the logical OR of the request pins on each internal PCI bus.

The internal PCI bus master may receive the internal GNT# at any time from the internal PCI arbiter (hidden arbitration). The internal bus masters are still responsible for continuously monitoring FRAME#, IRDY#, and their internal GNT# input to guarantee bus ownership is maintained before starting the access. FRAME# and IRDY# must be high and the grant input must be low on the rising clock edge which defines the clock cycle in which the master then drives FRAME# low to start a cycle. The internal PCI arbitration units will monitor the external grant signals (P_GNT# and S_GNT#) and will only apply an internal grant based on the external grant signals being true.

The internal PCI arbiter will remove an internal bus master's GNT# under the following situations:
  The external grant (P_GNT# and S_GNT#) signal goes inactive.
  The internal arbiter deactivates an internal bus masters internal grant signal.
  The current bus owner removes its REQ# output. Each bus masters grant input can be considered the OR condition of the external grant and the internal grant from inside the internal PCI bus arbitration unit. The arbitration unit will activate an internal grant to a bus master based on the winner of the arbitration scheme, but the actual GNT# signal driven to the grant input of a bus master is derived from the OR condition of the internal grant with the external grant input.

The internal arbitration unit is responsible for making sure that only one internal GNT# is active at any one time. Once an internal bus master loses the internal GNT# signal, it must eventually release bus ownership. The internal GNT# signal adheres to the rules for GNT# signal deassertion in the PCI Local Bus Specification (Arbitration Signaling Protocol). Further details needed to implement internal PCI bus arbitration should be readily apparent to persons skilled in the field of the invention.

$I^2C$ Bus Interface Unit

The following is a description of the $I^2C$ (Inter-Integrated Circuit) Bus Interface Unit of the P2P processor. The operation modes, setup, and implementation of the $I^2C$ Bus Interface Unit are described below.

Overview

The I2C bus interface unit 61 allows the local processor 34 to serve as a master and slave device residing on the $I^2C$ bus. The $I^2C$ bus is a serial bus developed by Philips Corporation consisting of a two pin interface. SDA is the data pin for input and output functions and SCL is the clock pin for reference and control of the $I^2C$ bus.

The $I^2C$ bus allows the P2P processor to interface to other $I^2C$ peripherals and microcontrollers for system management functions. The serial bus requires a minimum of hardware for an economical system to relay status and reliability information on the P2P subsystem to an external device.

The $I^2C$ bus interface unit is a peripheral device that resides on the internal P2P local bus. Data is transmitted to and received from the $I^2C$ bus via a buffered interface. Control and status information is relayed through a set of local processor memory mapped registers. The $I^2C$ Bus Specification contains complete details on $I^2C$ bus operation.

Theory Of Operation

The $I^2C$ bus defines a complete serial protocol for passing information between agents on the bus using only a two pin interface. Each device on the bus is recognized by a unique 7-bit address and can operate as a transmitter or as a receiver. In addition to transmitter and receiver, the $I^2C$ bus functions in a master/slave mode.

As an example of I2C bus operation, consider the case of a microcontroller acting as a master on the bus. The microcontroller, as a master, could address an EEPROM as a slave to receive write data. The microcontroller would be a master-transmitter and the EEPROM would be a slave-receiver. If the microcontroller wanted to read data, the microcontroller would be a master-receiver and the EEPROM would be a slave-transmitter. In both cases, the master initiates and terminates the transaction.

The I²C bus allows for a multi-master system, which means more than one device can try to initiate data transfers at the same time. The I²C bus defines an arbitration procedure to handle this situation. If two or more masters drive the bus at the same time, the first master to produce a one when the others produce a zero will lose the arbitration. This is dependent on the wired-AND operation of the SDA and the SCL I²C bus lines.

The serial operation of the I²C bus uses a wired-AND bus structure. This is the method for multiple devices to drive the bus lines and to signal each other about events such as arbitration, wait states, error conditions and so on. For instance, when a master drives the clock (SCL) line during a data transfer, it will transfer a bit on every instance that the clock is high. If the slave is unable to accept or drive data at the rate that the master is requesting, it can hold the clock line low between the high states to essentially insert wait states. The wired-AND is implemented on the output stage of the device. Data on the I²C bus can be transferred at a maximum rate of 400 Kbits/sec.

I²C transactions are either initiated by the local processor as a master or are received by the processor as a slave. Both conditions may result in the processor doing reads, writes, or both to the I²C bus.

Operational Blocks

Figure 11:
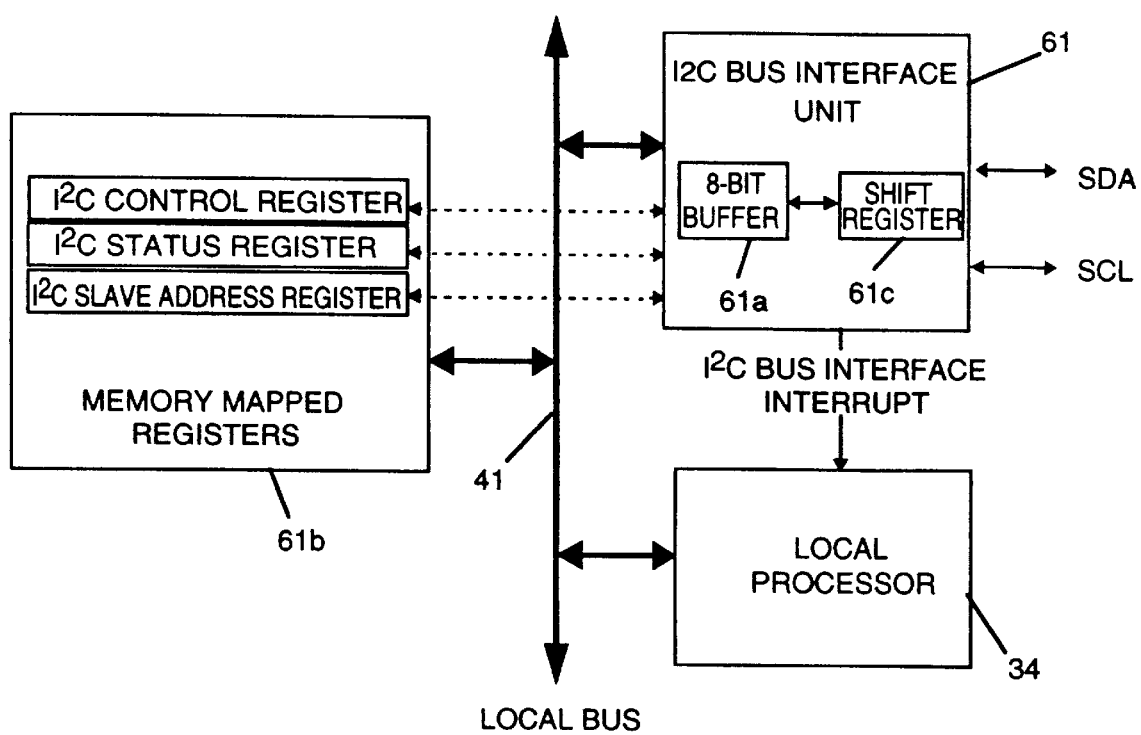
FIG. 11 is a block diagram of the I$^2$C Bus Interface Unit and its interface to the local bus.

The I2C Bus Interface Unit of the P2P processor is a slave peripheral device that is connected to the local bus. The unit uses the P2P processor interrupt mechanism for notifying the local processor that there is activity on the I²C bus. FIG. 11 shows a block diagram of the I²C Bus Interface Unit and its interface to the local bus.

The I²C Bus Interface Unit consists of the two wire interface 61 to the I²C bus, an 8-bit buffer 61a for data passing to and from the local processor, a set of control and status registers 61b, and a shift register for parallel/serial conversions 61c.

The I²C interrupts are signaled through processor interrupt XINT7# and the XINT7 Interrupt Status Register (X7ISR). The I²C Bus Interface Unit sets a bit within the X7ISR register when a buffer full, buffer empty, slave address detected, arbitration lost, or bus error condition occurs. All interrupt conditions are cleared explicitly by the local processor.

The I²C Data Buffer Register (IDBR) is an 8-bit data buffer that receives a byte data from the shift register interface of the I²C bus on one side and parallel data from the P2P processor local bus on the other side. The serial shift register is not user accessible.

APIC Bus Interface Unit

The following is a description of the APIC Bus Interface Unit 63 which provides a mechanism for communication between the local bus and the 3-wire APIC bus. It provides two basic functions:

It gives the local processor the ability to send an interrupt message out onto the APIC bus and optionally be interrupted when the message has been sent. The local processor can then read the resulting status of the message transmission to check for errors.

It can also receive EOI messages from the APIC bus and optionally interrupt the local processor to inform it that an EOI vector is available.

The operation modes, setup and implementation of the interface are described below.

APIC Archcitecture Overview

The APIC interrupt architecture is specified as the interrupt architecture for all Multiprocessor Specification (MPS) compatible systems. MPS Version 1.1 is available from Intel Corporation, Order No. 242016-003. The main features of the APIC architecture are:

1. APIC provides multiprocessor interrupt management for Intel Architecture CPUs such as the 90 and 100 MHz Pentium Processors, providing both static and dynamic symmetric interrupt distribution across all processors.
2. Dynamic interrupt distribution includes routing of the interrupt to the lowest-priority processor.
3. APIC works in systems with multiple I/O subsystems, where each subsystem can have its own set of interrupts.
4. APIC provides inter-processor interrupts, allowing any processor to interrupt any processor or set of processors, including itself.
5. Each APIC interrupt input pin is individually programmable by software as either edge or level triggered. The interrupt vector and interrupt steering information can be specified per pin.
6. APIC supports a naming/addressing scheme that can be tailored by software to fit a variety of system architecture's and usage models.
7. APIC supports system-wide processor control functions related to NMI, INIT, and System Management Interrupt (SMI).
8. APIC co-exists with the 8259A PIC to maintain PC compatibility.
9. APIC provides programmable interrupt priority (vectors) for each interrupt Input Pin. Since the APIC programming interface consists of two 32-bit memory locations, I/O APIC functionality can be emulated by the local processor in the P2P processor.

Specific implementation details for an I/O APIC suitable for use with the invention should be readily apparent to persons skilled in the field of the invention.

We claim:

1. An integrated circuit for coupling a first PCI external bus to a second PCI external bus comprising:
   a) a first internal bus for coupling to said first PCI external bus;
   b) a second internal bus for coupling to said second PCI external bus;
   c) a PCI-PCI bus bridge having a first bus interface coupled to said first internal bus and a second bus interface coupled to said second internal bus, said bus bridge for allowing transactions to be passed between said first and second external PCI buses;
   d) a local processor having a local address space, said local processor coupled to said bus bridge for processing transactions received from external sources and transactions input to said first bus interface and said second bus interface;
   e) a local bus for passing data between said processor and a memory accessible within said local address space,
   f) a memory controller for controlling writes to and reads from said memory using data and addresses on said local bus.

2. The integrated circuit defined by claim 1 further comprising:
   a) a first address translation circuit coupled to said local bus and said first internal bus adapted to convert for inbound transactions, addresses on said first internal bus to addresses usable by said local processor, and for outbound transactions, addresses on said local bus to addresses usable by devices coupled to said first external bus;

b) a second address translation circuit coupled to said local bus and said second internal bus adapted to convert, for inbound transactions, addresses on said second internal bus to addresses usable by said local processor, and, for outbound transactions, addresses on said local bus to addresses usable by devices coupled to said second external bus.

3. The integrated circuit defined by claim 2 further comprising:

a messaging circuit coupled to said first address translation circuit adapted to generate an interrupt for use by said local processor when new data is placed onto said first internal bus and to generate an interrupt on at least one interrupt line of said first internal bus when said local processor puts data onto said local bus for use by a device coupled to said first external bus.

4. The integrated circuit defined by claim 2 further comprising:

a) a first bus arbitrator for controlling accesses to said first internal bus between said first bus interface and said first address translation circuit;

b) a second bus arbitrator for controlling accesses to said second internal bus between said second bus interface and said second address translation circuit.

5. The integrated circuit defined by claim 2 further comprising:

a local bus arbitrator for controlling accesses to said local bus among said local processor, said first address translation circuit and said second address translation circuit.

6. The integrated circuit defined by claim 1 further comprising:

a first DMA controller coupled to said local bus and said first internal bus for transferring blocks of data between said first internal bus and said local memory;

a second DMA controller coupled to said local bus and said second internal bus for transferring blocks of data between said second internal bus and said local memory.

7. The integrated circuit defined by claim 6 further comprising:

a) a first bus arbitrator for controlling accesses to said first internal bus among said first bus interface, said first address translation circuit and said first DMA controller means;

b) a second bus arbitrator for controlling accesses to said second internal bus among said second bus interface, said second address translation circuit and said second DMA controller.

8. The integrated circuit defined by claim 1 further comprising:

a) a peripheral interrupt controller for routing a plurality of interrupt sources into a single interrupt input to said local processor means;

b) a status register defining which one of said plurality of interrupt sources caused said single interrupt.

9. The integrated circuit defined by claim 1 further comprising:

a) an I²C bus for coupling to external sensors suitable for management of a system utilizing said integrated circuit;

b) an I²C interface for allowing said local processor means to serve as a master and slave device residing on said an I²C bus.

10. The integrated circuit defined by claim 1 further comprising:

a) an APIC bus for coupling to external processors;

b) an APIC interface for enabling communications between said external processors and said local processor.

11. The integrated circuit defined by claim 1 wherein said PCI-PCI bus bridge further comprises:

a) a downstream posting buffer coupled between said first bus interface and said second bus interface;

b) an upstream posting buffer coupled between said first bus interface and said second bus interface;

c) a set of configuration registers coupled to said first bus interface.

12. The integrated circuit defined by claim 1 wherein said local processor comprises a microprocessor.

13. The circuit defined by claim 1 wherein said memory is external to said integrated circuit.

14. A system including at least one host processor coupled to a primary PCI bus and at least one peripheral device coupled to a secondary PCI bus comprising in a single integrated circuit:

a) a first internal bus coupled to said primary PCI bus;

b) a second internal bus coupled to said secondary PCI bus;

c a bus bridge having a first bus interface coupled to said first internal bus and a second bus interface coupled to said second internal bus, said bus bridge for allowing transactions to be passed between said primary PCI bus and said secondary PCI bus;

d local processor coupled to said bus bridge for processing transactions received from external sources and transactions input to said first bus interface and said second bus interface;

e a local bus for passing data between said processor and a memory;

f) a memory controller for controlling writes to and reads from said memory using data and addresses on said local bus.

15. The system defined by claim 14 wherein said integrated circuit further comprises:

a) a first address translation circuit coupled to said local bus and said first internal bus adapted to convert for inbound transactions addresses on said first internal bus to addresses usable by said local processor, and for outbound transactions addresses on said local bus to addresses usable by devices coupled to said primary PCI bus;

b) a second address translation circuit coupled to said local bus and said second internal bus adapted to convert for inbound transactions addresses on said second internal bus to addresses usable by said local processor, and for outbound transactions addresses on said local bus to addresses usable by devices coupled to said secondary PCI bus.

16. The system defined by claim 15 wherein said integrated circuit further comprises:

a messaging circuit coupled to said first address translation circuit adapted to generate an interrupt for use by said local processor when new data is placed onto said first internal bus and to generate an interrupt on at least one interrupt line of said first internal bus when said local processor puts data onto said local bus for use by a device coupled to said primary PCI bus.

17. The system circuit defined by claim 15 wherein said integrated circuit further comprises:

a) a first bus arbitrator for controlling accesses to said first internal bus between said first bus interface and said first address translation circuit;

b) a second bus arbitrator for controlling accesses to said second internal bus between said second bus interface and said second address translation circuit.

18. The system defined by claim 15 wherein said integrated circuit further comprises:

local bus arbitrator for controlling accesses to said local bus among said local processor, said first address translation circuit and said second address translation circuit.

19. The system defined by claim 14 wherein said integrated circuit further comprises:

a first DMA controller coupled to said local bus and said first internal bus for transferring blocks of data between said first internal bus and said local memory;

a second DMA controller coupled to said local bus and said second internal bus for transferring blocks of data between said second internal bus and said local, memory.

20. The system defined by claim 19 wherein said integrated circuit further comprises:

a) a first bus arbitrator for controlling accesses to said first internal bus among said first bus interface, said first address translation circuit and said first DMA controller means;

b) a second bus arbitrator for controlling accesses to said second internal bus among said second bus interface, said second address translation circuit and said second DMA controller.

21. The system defined by claim 14 wherein said integrated circuit further comprises:

a) a peripheral interrupt controller for routing a plurality of interrupt sources into a single interrupt input to said local processor;

b) a status register defining which one of said plurality of interrupt sources caused said single interrupt.

22. The system circuit defined by claim 14 wherein said integrated circuit further comprises:

a) an I$^2$C bus for coupling to external sensors suitable for management of a system utilizing said integrated circuit;

b) an I$^2$C interface for allowing said local processor to serve as a master and slave device residing on said an I$^2$C bus.

23. The system defined by claim 14 wherein said integrated circuit further comprises:

a) an APIC bus for coupling to external processors;

b) an APIC interface for enabling communications between said external processors and said local processor.

24. The system defined by claim 14 wherein said bus bridge further comprises:

a) a downstream posting buffer coupled between said first bus interface and said second bus interface;

b) an upstream posting buffer coupled between said first bus interface and said second bus interface;

c) a set of configuration registers coupled to said first bus interface.

25. The system defined by claim 14 wherein said local processor comprises a microprocessor.

26. The system defined by claim 14 wherein said memory is external to said integrated circuit.

* * * * *

UNITED STATES PATENT AND TRADEMARK OFFICE
CERTIFICATE OF CORRECTION

PATENT NO. : 5,884,027
DATED : March 16, 1999
INVENTOR(S) : Garbus et al.

It is certified that error appears in the above-identified patent and that said Letters Patent is hereby corrected as shown below:

Column 4,
Line 2, after "algorithm", delete "10".

Column 44,
Line 38, delete "ddress", insert -- address --.

Signed and Sealed this

Seventeenth Day of August, 2004

JON W. DUDAS
*Acting Director of the United States Patent and Trademark Office*